US010179623B2

(12) United States Patent
Sasaki et al.

(10) Patent No.: US 10,179,623 B2
(45) Date of Patent: Jan. 15, 2019

(54) VEHICLE

(71) Applicant: YAMAHA HATSUDOKI KABUSHIKI KAISHA, Iwata-shi, Shizuoka (JP)

(72) Inventors: Kaoru Sasaki, Shizuoka (JP); Mitsuaki Ohta, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 475 days.

(21) Appl. No.: 14/901,360

(22) PCT Filed: Jun. 30, 2014

(86) PCT No.: PCT/JP2014/067483
§ 371 (c)(1),
(2) Date: Dec. 28, 2015

(87) PCT Pub. No.: WO2015/002170
PCT Pub. Date: Jan. 8, 2015

(65) Prior Publication Data
US 2016/0121954 A1    May 5, 2016

(30) Foreign Application Priority Data
Jul. 1, 2013    (JP) .................................. 2013-138486

(51) Int. Cl.
*B62J 17/02*    (2006.01)
*B62K 5/08*    (2006.01)
(Continued)

(52) U.S. Cl.
CPC ............... *B62J 17/02* (2013.01); *B62J 17/06* (2013.01); *B62K 5/027* (2013.01); *B62K 5/05* (2013.01); *B62K 5/08* (2013.01); *B62K 5/10* (2013.01)

(58) Field of Classification Search
CPC ........... B62J 17/02; B62J 17/06; B62K 5/027; B62K 5/10; B62K 5/05
(Continued)

(56) References Cited

U.S. PATENT DOCUMENTS 4,351,410 A  *  9/1982  Townsend ................ B62D 9/02
                                                         180/210
D547,242 S         7/2007  Lambri
(Continued)

FOREIGN PATENT DOCUMENTS

CN          1215954 C        8/2005
CN        103153769 A        6/2013
(Continued)

OTHER PUBLICATIONS

Official Communication issued in International Application PCT/JP2014/067483, dated Sep. 9, 2014.

*Primary Examiner* — Ruth Ilan
(74) *Attorney, Agent, or Firm* — Keating and Bennett, LLP

(57) ABSTRACT

An inner fender includes a cover surface, a left projecting portion, and a right projecting portion. Under a condition that a body frame is in an upright state and that a left front wheel and a right front wheel are not turned, the left projecting portion projects forward from the cover surface behind a rear edge of the left front wheel; the right projecting portion projects forward from the cover surface behind a rear edge of the right front wheel; and a portion of the cover surface between the left projecting portion and the right projecting portion faces a space defined between the left front wheel and the right front wheel.

10 Claims, 10 Drawing Sheets

(51) Int. Cl.
  *B62K 5/10* (2013.01)
  *B62K 5/027* (2013.01)
  *B62K 5/05* (2013.01)
  *B62J 17/06* (2006.01)

(58) Field of Classification Search
  USPC .................................................. 280/124.103
  See application file for complete search history.

(56) References Cited

U.S. PATENT DOCUMENTS

| | | | |
|---|---|---|---|
| D598,328 S * | 8/2009 | Lambri | B62K 5/05 D12/110 |
| D656,435 S * | 3/2012 | Lambri | B62K 5/027 D12/110 |
| 9,663,155 B2 * | 5/2017 | Nishimoto | B62J 17/00 |
| D810,628 S * | 2/2018 | Li | D12/107 |
| 2013/0168944 A1 | 7/2013 | Bartolozzi et al. | |
| 2013/0320697 A1 * | 12/2013 | Yokouchi | B62J 17/065 296/78.1 |
| 2014/0353940 A1 | 12/2014 | Bartolozzi et al. | |

FOREIGN PATENT DOCUMENTS

| | | | |
|---|---|---|---|
| EP | 2 447 137 A1 | 5/2012 | |
| EP | 2 923 930 A1 | 9/2015 | |
| JP | 2003-182670 A | 7/2003 | |
| JP | 2012-56503 A | 3/2012 | |
| JP | 2012-91704 A | 5/2012 | |
| TW | 200303834 A | 9/2003 | |
| TW | I290107 B | 11/2007 | |
| WO | WO-2004078569 A1 * | 9/2004 | B62J 17/06 |

* cited by examiner

VEHICLE

BACKGROUND OF THE INVENTION

1. Field of the Invention

The present invention relates to a vehicle including a leanable body frame and two front wheels which are arranged side by side in a left-right direction.

2. Description of the Related Art

A vehicle is known including a body frame which leans in a left-right direction of the vehicle when the vehicle turns to the left or the right and two front wheels which are arranged side by side in a left-right direction of the body frame (refer to U.S. Design Pat. No. D547,242S, for example).

This type of vehicle is a vehicle that turns with its body frame leaning from a vertical direction. More specifically, the body frame leans to the right of the vehicle when the vehicle turns to the right, while when the vehicle turns to the left, the body frame leans to the left of the vehicle. In this type of vehicle, a distance between the two front wheels which are arranged side by side in the left-right direction of the body frame is very short compared with a general four-wheeled vehicle, so as to ensure a large leaning amount of the body frame. Consequently, this type of vehicle is compact in size in relation to the left-right direction of the body frame.

SUMMARY OF THE INVENTION

As a result of riding tests for this type of vehicle that were carried out at the time of raining or through pools of water, a phenomenon was confirmed that leg portions of rider sitting on a seat that is disposed behind the front wheels are splashed with water scattered by the front wheels.

Consequently, preferred embodiments of the present invention reduce the size of a vehicle including a leanable body frame and two front wheels arranged side by side in a left-right direction of the body frame, while significantly reducing or preventing the occurrence of the phenomenon that the leg portions of a rider sitting on a seat from being splashed with water scattered by the two front wheels.

A preferred embodiment of the present invention is a vehicle including a body frame that leans to the left of the vehicle when the vehicle turns leftward and that leans to the right of the vehicle when the vehicle turns rightward; a left front wheel and a right front wheel disposed ahead of the seat in a front-rear direction of the body frame so as to be arranged side by side in a left-right direction of the body frame; a seat supported by the body frame and disposed behind the left front wheel and the right front wheel in a front-rear direction of the body frame; a steering device that turns the left front wheel and the right front wheel; and an inner fender disposed behind the left front wheel and the right front wheel in the front-rear direction of the body frame, and ahead of the seat in the front-rear direction of the body frame, wherein the inner fender includes a cover surface disposed behind a rear edge of the left front wheel and a rear edge of the right front wheel under a condition that the body frame is in an upright state and that the left front wheel and the right front wheel are not turned by the steering device; a left projecting portion projecting forward in the front-rear direction from the cover surface, extending in an up-down direction of the body frame, and disposed on the left of a center of the vehicle in the left-right direction of the body frame, on the right of a left end of the vehicle in the left-right direction of the body frame, and behind a rear edge of the left front wheel in the front-rear direction of the body frame under the condition that the body frame is in the upright state and that the left front wheel and the right front wheel are not turned by the steering device; and a right projecting portion projecting forward in the front-rear direction from the cover surface, extending in the up-down direction of the body frame, and disposed on the right of the center of the vehicle in the left-right direction of the body frame, on the left of a right end of the vehicle in the left-right direction of the body frame, and behind a rear edge of the right front wheel in the front-rear direction of the body frame under the condition that the body frame is in the upright state and that the left front wheel and the right front wheel are not turned by the steering device; and at least a portion of the cover surface located between the left projecting portion and the right projecting portion faces a space defined between the left front wheel and the right front wheel under the condition that the body frame is in the upright state and that the left front wheel and the right front wheel are not turned by the steering device.

The inventors studied in detail the reason for the occurrence of the phenomenon of the leg portions of the rider being splashed with water scattered by the two front wheels. As a result, the following phenomenon was discovered and confirmed.

Water scattered by the left front wheel and the right front wheel while the vehicle is running adheres to the inner fender that is disposed behind the rear edges of the two front wheels. A portion of the water adhering to the inner fender is pushed to move to the left end portion of the inner fender by the airflow that passes between the rear edge of the left front wheel and the inner fender by way of the space defined between the left front wheel and the right front wheel. The water that has moved is taken by the airflow that flows rearward along an area directly on the left of the vehicle, and is scattered rearward from the left end portion of the inner fender. The water that has been scattered splashes the leg portions and the like of the rider who is sitting on the seat that is disposed behind the left front wheel. Similarly, a portion of the water adhering to the inner fender is pushed to move to the right end portion of the inner fender by the airflow that passes between the rear edge of the right front wheel and the inner fender by way of the space defined between the left front wheel and the right front wheel. The water that has moved is taken by the airflow that flows rearward along an area directly on the right of the vehicle, and is scattered rearward from the right end portion of the inner fender. The water that has been scattered splashes the leg portions and the like of the rider who is sitting on the seat that is disposed behind the right front wheel.

Namely, in the vehicle including the leanable body frame and the two front wheels that are arranged side by side in the left-right direction of the body frame, the occurrence of the phenomenon described above is attributed to the occurrence of the airflow that passes between the rear edge of the left front wheel and the inner fender by way of the space defined between the left front wheel and the right front wheel and the airflow that passes between the rear edge of the right front wheel and the inner fender. In other words, the phenomenon described above is a phenomenon specific to a vehicle including a leanable body frame and two front wheels arranged side by side in the left-right direction of the body frame. Then, the inventors conceived of projecting the shield in the left-right direction that covers the front faces of the leg portions of the rider sitting on the seat to block drops of water scattered rearward. However, the shield needs to project a large amount to obtain the designed effect, resulting in an increase in the size of the vehicle.

Then, the inventors studied a configuration that is able to significantly reduce or prevent the amount of water that flows rearward of such a vehicle while reducing the size thereof. As a result of the inventor's studies, the inventors discovered and developed a construction in which the left projecting portion blocks the movement of the water adhering to the inner fender as a result of being pushed by the airflow that passes between an area behind the left front wheel and the inner fender by way of the space defined between the left front wheel and the right front wheel, and the right projecting portion blocks the movement of water adhering to the inner fender as a result of being pushed by the airflow that passes between an area behind the right front wheel and the inner fender by way of the space defined between the left front wheel and the right front wheel are caused to project to an area ahead of the inner fender.

Specifically, the inner fender includes the cover surface that is disposed behind the rear edge of the left front wheel and the rear edge of the right front wheel in the front-rear direction of the body frame in such a state that the body frame is in the upright state and that the left front wheel and the right front wheel are not turned by the steering device. In addition, the inner fender includes the left projecting portion that is disposed on the left of the center of the vehicle in the left-right direction of the body frame, on the right of the left end of the vehicle in the left-right direction of the body frame, and behind the rear edge of the left front wheel in the front-rear direction of the body frame and that extends in the up-down direction of the body frame while projecting from the cover surface forward in the front-rear direction of the body frame in such a state that the body frame is in the upright state and that the left front wheel and the right front wheel are not turned by the steering device, and the right projecting portion that is disposed, on the right of the center of the vehicle in the left-right direction of the body frame, on the left of the right end of the vehicle in the left-right direction of the body frame, and behind the rear edge of the right front wheel in the front-rear direction of the body frame and that extends in the up-down direction of the body frame while projecting from the cover surface forward in the front-rear direction of the body frame in such a state that the body frame is in the upright state and that the left front wheel and the right front wheel are not turned by the steering device. Further, at least in such a state that the body frame is in the upright state and that the left front wheel and the right front wheel are not turned by the steering device, a portion of the cover surface that is located between the left projecting portion and the right projecting portion faces the space defined between the left front wheel and the right front wheel.

According to this configuration, a portion of the water that was scattered by the left front wheel and the right front wheel and that has passed through the space defined between the left front wheel and the right front wheel adheres to the portion of the cover surface which is located between the left projecting portion and the right projecting portion. A portion of the water that has adhered to the cover surface is pushed to move towards the left end portion of the inner fender by the airflow that passes between the rear edge of the left front wheel and the inner fender by way of the space defined between the left front wheel and the right front wheel. However, the water that has moved is prevented from reaching the left end portion by the left projecting portion. In addition, a portion of the water that has adhered to the cover surface is pushed to move towards the right end portion of the inner fender by the airflow that passes between the rear edge of the right front wheel and the inner fender by way of the space defined between the left front wheel and the right front wheel. However, the water that has moved is prevented from reaching the right end portion by the right projecting portion.

Further, by providing the left projecting portion and the right projecting portion in the manner described above, compared with a construction in which the inner fender is not provided with such projecting portions and is open in the left-right direction, it was discovered that an airflow that flows toward an area directly below the vehicle along the cover surface at high speeds is generated in a space defined between the two projecting portions. The water that has adhered to the cover surface is not only prevented from moving to the left end portion and the right end portion of the inner fender by the left projecting portion and the right projecting portion but also is guided to an area directly below the vehicle by the high-speed airflow that is formed between the two projecting portions. Consequently, the amount of water which is scattered rearward by way of the left and right end portions of the inner fender is significantly reduced or prevented.

Since it is not necessary to provide structures that extend in the left-right direction of the body frame such as the shield to obtain the effects described above, it is possible to reduce the size of the vehicle.

Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that the left projecting portion includes a right side surface oriented rightward in the left-right direction of the body frame, the right projecting portion includes a left side surface oriented leftward in the left-right direction of the body frame, the right side surface of the left projecting portion and the cover surface defines a left bent portion extending in the up-down direction, and the left side surface of the right projecting portion and the cover surface defines a right bent portion extending in the up-down direction.

According to this configuration, it is possible to significantly reduce or prevent the occurrence of a phenomenon that the water pushed by the airflow that passes between the rear edge of the left front wheel and the inner fender by way of the space defined between the left front wheel and the right front wheel rides over the left projecting portion. In addition, it is possible to significantly reduce or prevent the occurrence of a phenomenon that the water pushed by the airflow that passes between the rear edge of the right front wheel and the inner fender by way of the space defined between the left front wheel and the right front wheel rides over the right projecting portion. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that an angle defined by each of the left bent portion and the right bent portion is no less than about 45 degrees and no greater than about 135 degrees, for example.

According to this configuration, the water that is pushed by the airflow that passes between the rear edge of the left front wheel and the inner fender by way of the space defined between the left front wheel and the right front wheel is easily held on the right side surface of the left projecting portion, thus making it possible to significantly reduce or prevent the occurrence of a phenomenon that the water rides over the left projecting portion. In addition, the water that is pushed by the airflow that passes between the rear edge of the right front wheel and the inner fender by way of the space defined between the left front wheel and the right front wheel is easily held on the left side surface of the right projecting portion, thus making it possible to significantly reduce or prevent the occurrence of a phenomenon that the water rides over the right projecting portion. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that at least a portion of the left projecting portion is located behind the left front wheel in the front-rear direction of the body frame under the condition that the body frame is in the upright state and that the left front wheel and the right front wheel are not turned by the steering device; and at least a portion of the right projecting portion is located behind the right front wheel in the front-rear direction of the body frame under the condition that the body frame is in the upright state and that the left front wheel and the right front wheel are not turned by the steering device.

The airflow that passes between the rear edge of the left front wheel and the inner fender by way of the space defined between the left front wheel and the right front wheel increases its speed at an area directly behind the left front wheel. By disposing the left projecting portion at that location, the water that is pushed by the high-speed airflow to move is blocked by the left projecting portion effectively. Similarly, the airflow that passes between the rear edge of the right front wheel and the inner fender by way of the space defined between the left front wheel and the right front wheel increases its speed at an area directly behind the right front wheel. By disposing the right projecting portion at that location, the water that is pushed by the high-speed airflow to move is blocked by the right projecting portion effectively. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that the cover surface includes a left cover surface disposed on the left of the center of the vehicle in the left-right direction of the body frame under the condition that the body frame is in the upright state and that the left front wheel and the right front wheel are not turned by the steering device; and a right cover surface disposed on the right of the center of the vehicle in the left-right direction of the body frame under the condition that the body frame is in the upright state and that the left front wheel and the right front wheel are not turned by the steering device; a left portion of the left cover surface is disposed behind a right portion of the left cover surface in the front-rear direction of the body frame under the condition that the body frame is in the upright state and that the left front wheel and the right front wheel are not turned by the steering device; a right portion of the right cover surface is disposed behind a left portion of the right cover surface in the front-rear direction of the body frame under the condition that the body frame is in the upright state and that the left front wheel and the right front wheel are not turned by the steering device; the left projecting portion is adjacent to the left portion of the left cover surface; and the right projecting portion is adjacent to the right portion of the right cover surface.

Here, the "left portion of the left cover surface" means an area which is closer to a left end portion of the left cover surface than a right end portion of the left cover surface. The "right portion of the left cover surface" means an area which is closer to a right end portion of the left cover surface than a left end portion of the left cover surface. The "left portion of the right cover surface" means an area which is closer to a left end portion of the right cover surface than a right end portion of the right cover surface. The "right portion of the right cover surface" means an area which is closer to a right end portion of the right cover surface than a left end portion of the right cover surface.

According to this configuration, since the left end portion of the left cover surface is disposed behind the right end portion, the water adhering to the left cover surface is pushed to move rearward by the airflow that passes between the rear edge of the left front wheel and the inner fender by way of the space defined between the left front wheel and the right front wheel. Since the water pushed by the airflow is moving rearward, the water has difficulty in riding over the left projecting portion that project forward. In addition, since the right end portion of the right cover surface is disposed behind the left end portion, the water adhering to the right cover surface is pushed to move rearward by the airflow that passes between the rear edge of the right front wheel and the inner fender by way of the space defined between the left front wheel and the right front wheel. Since the water pushed by the airflow is moving rearward, the water has difficulty in riding over the right projecting portion that project forward. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame smaller in size.

The vehicle is preferably configured such that a projecting amount of the left projecting portion from the cover surface increases as the left projecting portion extends upward in the up-down direction of the body frame; and a projecting amount of the right projecting portion from the cover surface increases as the right projecting portion extends upward in the up-down direction of the body frame.

According to this configuration, it is difficult for the water moving on the cover surface to ride over the left projecting portion, as a result of being pushed by the airflow that passes between the rear edge of the left front wheel and the inner fender by way of the space defined between the left front wheel and the right front wheel. In addition, it is difficult for the water moving on the cover surface to ride over the right projecting portion, as a result of being pushed by the airflow that passes between the rear edge of the right front wheel and the inner fender by way of the space defined between the left front wheel and the right front wheel. Further, it is possible to enhance the effect of guiding the water adhering to the cover surface toward an area directly below the vehicle by the airflow that is produced between the left projecting portion and the right projecting portion. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle preferably includes a wall portion extending in the left-right direction of the body frame, and projecting forward in the front-rear direction from the cover surface between the left projecting portion and the right projecting portion.

According to this configuration, the water adhering to the inner fender is prevented from moving upwards by the wall portion. This enhances the effect of guiding the water adhering to the inner fender toward an area directly below the vehicle by the airflow that is produced between the left projecting portion and the right projecting portion. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that a projecting amount of the left projecting portion from the cover surface and a projecting amount of the right projecting portion from the cover surface is greater than a projecting amount of the wall portion.

According to this configuration, it is possible to prevent the occurrence of a phenomenon that the water that has adhered to the inner fender and has been blocked from moving upwards by the wall portion rides over the left projecting portion and the right projecting portion to reach the left and right sides of the vehicle. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that the wall portion includes a left wall portion disposed on the left of the center of the vehicle in the left-right direction under the condition that the body frame is in the upright state and that the left front wheel and the right front wheel are not turned by the steering device; a right wall portion disposed on the right of the center of the vehicle in the left-right direction under the condition that the body frame is in the upright state and that the left front wheel and the right front wheel are not turned by the steering device; the left projecting portion includes a right side surface oriented rightward in the left-right direction of the body frame; the right projecting portion includes a left side surface oriented leftward in the left-right direction of the body frame; a left end portion of the left wall portion is in contact with the right side surface; and a right end portion of the right wall portion is in contact with the left side surface.

According to this configuration, the water adhering to the inner fender and blocked from moving upwards by the left wall portions is allowed to move easily downwards along the right side surface by an airflow that is produced between the left projecting portion and the right projecting portion. Similarly, the water adhering to the inner fender and blocked from moving upwards by the right wall portions is allowed to move easily downwards along the left side surface by the airflow that is produced between the left projecting portion and the right projecting portion. This significantly reduces or prevents the occurrence of the phenomenon that the water adhering to the inner fender rides over the left projecting portion and the right projecting portion to reach the left and right sides of the vehicle. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that the wall portion inclines downward in the up-down direction of the body frame.

According to this configuration, it is possible to block the water adhering to the inner fender from moving upwards. This enhances the effect of guiding the water adhering to the inner fender toward an area directly below the vehicle by the airflow that is produced between the left projecting portion and the right projecting portion. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle is preferably configured such that an opening penetrating the cover surface is provided directly below the wall portion.

According to this configuration, the water adhering to the inner fender and blocked from moving upwards by the wall portion is guided into the opening. The water that enters the opening flows along, for example, the inner fender to drop toward an area directly below the vehicle. This significantly reduces or prevents the amount of water that would be able to ride over the left projecting portion and the right projecting portion to reach the right and left sides of the vehicle. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame small in size.

The vehicle preferably includes a link mechanism disposed above the left front wheel and the right front wheel in the up-down direction, and that leans the body frame to the left or right of the vehicle by changing positions of the left front wheel and the right front wheel relative to the body frame. In this case, the vehicle is preferably configured such that the link mechanism includes an upper cross member, a lower cross member disposed below the upper cross member in the up-down direction of the body frame, a left side member disposed above the left front wheel in the up-down direction of the body frame, and a right side member disposed above the right front wheel in the up-down direction of the body frame; and the upper cross member, the lower cross member, the left side member, and the right side member are so connected that the upper cross member and the lower cross member are held in postures which are parallel to each other, and that the left side member and the right side member are held in postures which are parallel to each other.

With the above configuration, when compared with a so-called double wishbone link mechanism, it is easy to arrange components defining the link mechanism within the body cover. Consequently, it is possible to significantly reduce or prevent the occurrence of the phenomenon that the leg portions of the rider sitting on the seat are splashed with water scattered by the two front wheels while making the vehicle including the leanable body frame and the two front wheels that are arranged side by side in the left-right direction of the body frame smaller in size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
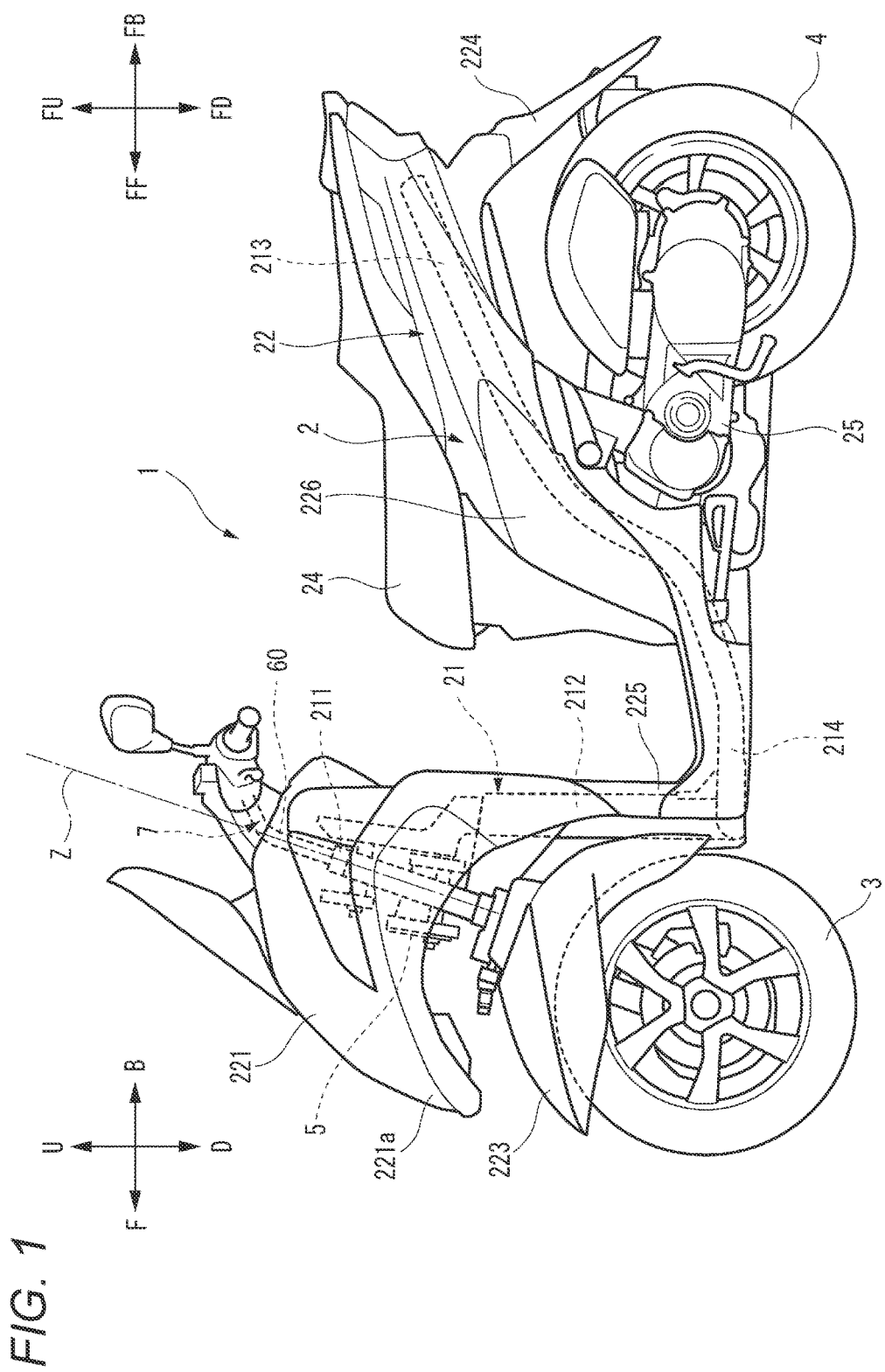
FIG. 1 is a side view of the whole a vehicle according to a preferred embodiment of the present invention, viewed from the left thereof.

Referring to the accompanying drawings, examples of the preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-right direction of the vehicle relative to a vertical direction. Accordingly, in addition to the directions based on the vehicle, directions based on the body frame will be defined. In the accompanying drawings, an arrow FF denotes a front or forward direction of the body frame. An arrow FB denotes a back/rear or backward/rearward direction of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame," and an "up-down direction of the body frame" means a front-rear direction, a left-right direction, and an up-down direction based on the body frame as viewed from a rider who rides the vehicle. "A side of or sideways of the body frame" means directly on the right or left of the body frame.

In this description, an expression "something extends in the front-rear direction of the body frame" includes a situation in which something extends while being inclined in relation to the front-rear direction of the body frame and means that something extends with a gradient which is closer to the front-rear direction of the body frame rather than the left-right direction and the up-down direction of the body frame.

In this description, an expression "something extends in the left-right direction of the body frame" includes a situation in which something extends while being inclined in relation to the left-right direction of the body frame and means that something extends with a gradient which is closer to the left-right direction of the body frame rather than the front-rear direction of the body frame and the up-down direction of the body frame.

In this description, an expression "something extends in the up-down direction of the body frame" includes a situation in which something extends while being inclined in relation to the up-down direction of the body frame and means that something extends with a gradient which is closer to the up-down direction of the body frame rather than the front-rear direction of the body frame and the left-right direction of the body frame.

In this description, an expression the "body frame is in the upright state" means that the up-down direction of the body frame coincides with the vertical direction in such a state that the vehicle is not steered. In this state, the directions based on the vehicle and the directions based on the vehicle frame coincide. When the vehicle is turning with the body frame leaning in the left-right direction relative to the vertical direction, the left-right direction of the vehicle does not coincide with the left-right direction of the body frame. Additionally, the up-and-down direction of the vehicle does not coincide with the up-and-down direction of the body frame, too. However, the front-rear direction of the vehicle coincides with the front-rear direction of the body frame.

Referring to FIGS. 1 to 10, a vehicle 1 according to preferred embodiments of the present invention will be described. The vehicle 1 is a vehicle which is driven by power generated from a power source and which includes a leanable body frame and two front wheels which are arranged side by side in the left-right direction of the body frame.

FIG. 1 is a left side view wherein the whole of the vehicle 1 is viewed from the left thereof. The vehicle 1 includes a vehicle main body 2, a pair of left and right front wheels 3, a rear wheel 4, a link mechanism 5, and a steering device 7.

The vehicle main body 2 includes a body frame 21, a body cover 22, a seat 24, and a power unit 25. In FIG. 1, the body frame 21 is in an upright state. The following description which refers to FIG. 1 will be made on the premise that the body frame 21 is in the upright state.

The body frame 21 includes a head pipe 211, a down frame 212, and a rear frame 213. In FIG. 1, portions of the body frame 21 which are hidden by the body cover 22 are shown by dashed lines. The body frame 21 supports the seat 24 and the power unit 25. The power unit 25 supports the rear wheel 4. The power unit 25 includes a power source such as an engine, an electric motor, a battery or the like and a device such as a transmission. The power source produces a force by which the vehicle 1 is driven.

The head pipe 211 is disposed at a front portion of the vehicle 1. When the body frame 21 is viewed from the left thereof, an upper portion of the head pipe 211 is disposed behind a lower portion of the head pipe 211.

The down frame 212 is connected to the head pipe 211. The down frame 212 is disposed directly behind the head pipe 211. The down frame 212 extends in the up-down direction of the body frame 21.

The rear frame 213 is disposed directly behind the down frame 212. The rear frame 213 extends in the front-rear direction of the body frame 21. The rear frame 213 supports the seat 24 and the power unit 25.

The body cover 22 includes a front cover 221, a pair of left and right front fenders 223, a rear fender 224, and an inner fender 225. The body cover 22 covers at least partially body portions which are mounted on the vehicle 1 such as the pair of left and right front wheels 3, the body frame 21, the link mechanism 5 and the like.

The front cover 221 is disposed ahead of the seat 24. The front cover 221 covers at least partially the link mechanism 5 and the steering device 7.

At least portions of the pair of left and right front fenders 223 are disposed directly below the front cover 221. At least the portions of the pair of left and right front fenders 223 are disposed directly above the pair of left and right front wheels 3, respectively.

At least a portion of the rear fender 224 is disposed directly above the rear wheel 4.

The inner fender 225 is disposed in a position where the leg shield 225 covers at least partially the legs of the rider. The inner fender 225 is disposed behind the pair of left and right front wheels 3 and ahead of the seat 24.

At least portions of the pair of left and right front wheels 3 are disposed directly below the head pipe 211. At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
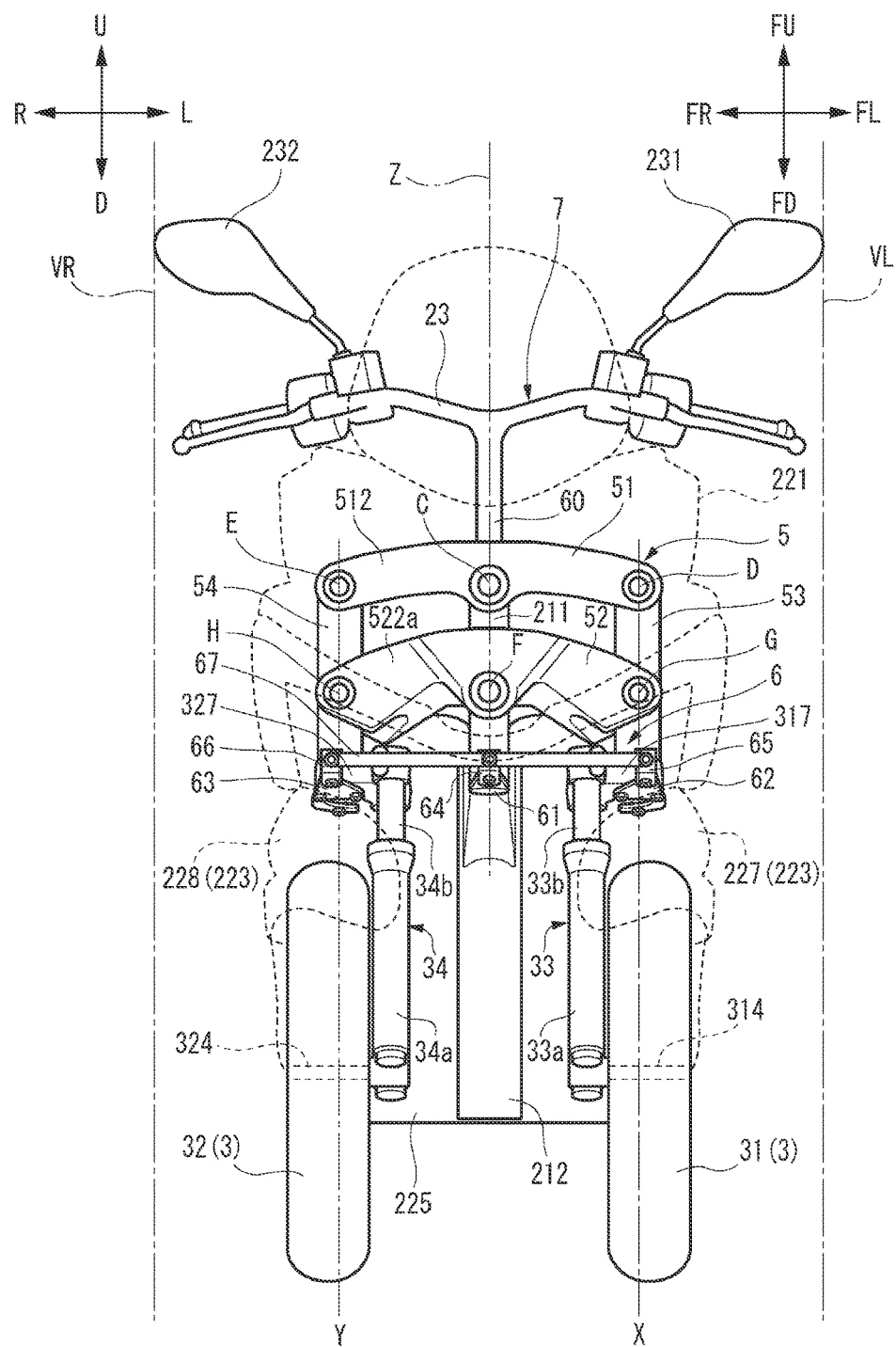
FIG. 2 is a front view showing a front portion of the vehicle of FIG. 1.

FIG. 2 is a front view of the front portion of the vehicle 1 as viewed from the front of the body frame 21. In FIG. 2, the body frame 21 is in the upright state. The following description which refers to FIG. 2 will be made on the premise that the body frame 21 is in the upright state. In FIG. 2, those elements shown therein are depicted as being seen through the front cover 221 and the pair of left and right front fenders 223 which are shown by dashed lines.

The pair of left and right front wheels 3 includes a left front wheel 31 and a right front wheel 32. The left front wheel 31 is disposed on the left of the head pipe 211 which defines a portion of the body frame 21. The right front wheel 32 is disposed on the right of the head pipe 211. The left front wheel 31 and the right front wheel 32 are disposed so as to be arranged side by side in the left-right direction of the body frame 21.

The steering device 7 includes a left shock absorbing mechanism 33, a right shock absorbing mechanism 34, a left bracket 317, and a right bracket 327.

The left shock absorbing mechanism 33 includes a left outer tube 33a. The left outer tube 33a supports the left front wheel 31. The left outer tube 33a extends in the up-down direction of the body frame 21. The left outer tube 33a includes a left supporting axle 314 at a lower end portion thereof. The left front wheel 31 is supported by the left supporting axle 314.

The left shock absorbing mechanism 33 includes a left inner tube 33b. The left inner tube 33b extends in the up-down direction of the body frame 21. The left inner tube 33b is disposed directly above the left outer tube 33a in such a state that a portion of the left inner tube 33b is inserted in the left outer tube 33a. An upper portion of the left inner tube 33b is fixed to the left bracket 317.

The left shock absorbing mechanism 33 is preferably a so-called telescopic shock absorbing mechanism. The left inner tube 33b moves relatively to the left outer tube 33a in a direction in which the left outer tube 33a extends, so that the left shock absorbing mechanism 33 is allowed to extend and contract in the extending direction of the left outer tube 33a. This enables the left shock absorbing mechanism 33 to absorb a displacement of the left front wheel 31 relative to the left inner tube 33b in the up-down direction of the body frame 21.

The left outer tube 33a and the left inner tube 33b preferably define a pair of telescopic elements which are arranged side by side in the front-rear direction of the body frame 21.

The right shock absorbing mechanism 34 includes a right outer tube 34a. The right outer tube 34a supports the right front wheel 32. The right outer tube 34a extends in the up-down direction of the body frame 21. The right outer tube 34a includes a right supporting axle 324 at a lower end portion thereof. The right front wheel 32 is supported by the right supporting axle 324.

The right shock absorbing mechanism 34 includes a right inner tube 34b. The right inner tube 34b extends in the up-down direction of the body frame 21. The right inner tube 34b is disposed directly above the right outer tube 34a in such a state that a portion thereof is inserted in the right outer tube 34a. An upper portion of the right inner tube 34b is connected to a right bracket 327.

The right shock absorbing mechanism 34 is preferably a so-called telescopic shock absorbing mechanism. The right inner tube 34b moves relatively to the right outer tube 34a in a direction in which the right outer tube 34a extends, so that the right shock absorbing mechanism 34 is allowed to extend and contract in the extending direction of the right outer tube 34a. This enables the right shock absorbing mechanism 34 to absorb a displacement of the right front wheel 32 relative to the right inner tube 34b in the up-down direction of the body frame 21.

The right outer tube 34a and the right inner tube 34b preferably define a pair of telescopic elements arranged side by side in the front-rear direction of the body frame 21.

The steering device 7 includes a steering force transmitting mechanism 6. The steering force transmitting mechanism 6 includes a handlebar 23 and a steering shaft 60. The handlebar 23 is attached to an upper portion of the steering shaft 60. A portion of the steering shaft 60 is turnably supported on the head pipe 211. A central turning axis Z of the steering shaft 60 extends in the up-down direction of the body frame 21. As shown in FIG. 1, the upper portion of the steering shaft 60 is disposed behind a lower portion thereof. Consequently, the central turning axis Z of the steering shaft 60 is inclined in the front-rear direction of the body frame 21. The steering shaft 60 turns about the central turning axis Z in response to the rider operating the handlebar 23. A left rearview mirror 231 is provided in a left portion of the handlebar 23. A right rearview mirror 232 is provided in a right portion of the handlebar 23.

The steering force transmitting mechanism 6 transmits a steering force with which the rider operates the handlebar 23 to the left bracket 317 and the right bracket 327. A specific configuration thereof will be described in detail below.

In the vehicle 1 according to the above preferred embodiment, the link mechanism 5 preferably uses a four parallel joint link system (also referred to as a parallelogram link).

As shown in FIG. 2, the link mechanism 5 is disposed below the handlebar 23. The link mechanism 5 is disposed above the left front wheel 31 and the right front wheel 32. The link mechanism 5 includes an upper cross member 51, a lower cross member 52, a left side member 53, and a right side member 54. The link mechanism 5 never turns about the central turning axis Z relative to the body frame 21 irrespective of the turning of the steering shaft 60 turns about the central turning axis Z in association with the operation of the handlebar 23.

The upper cross member 51 includes a plate member 512. The plate member 512 is disposed directly ahead of the head pipe 211. The plate member 512 extends in the left-right direction of the body frame 21.

An intermediate portion of the upper cross member 51 is supported on the head pipe 211 by a support portion C. The upper cross member 51 turns relative to the head pipe 211 about an intermediate upper axis which passes through the support portion C and extends in the front-rear direction of the body frame 21.

A left end portion of the upper cross member 51 is supported on the left side member 53 by a support portion D. The upper cross member 51 turns relative to the left side member 53 about a left upper axis which passes through the support portion D and extends in the front-rear direction of the body frame 21.

A right end portion of the upper cross member 51 is supported on the right side member 54 by a support portion E. The upper cross member 51 turns relative to the right side member 54 about a right upper axis which passes through the support portion E and extends in the front-rear direction of the body frame 21.

Figure 3:
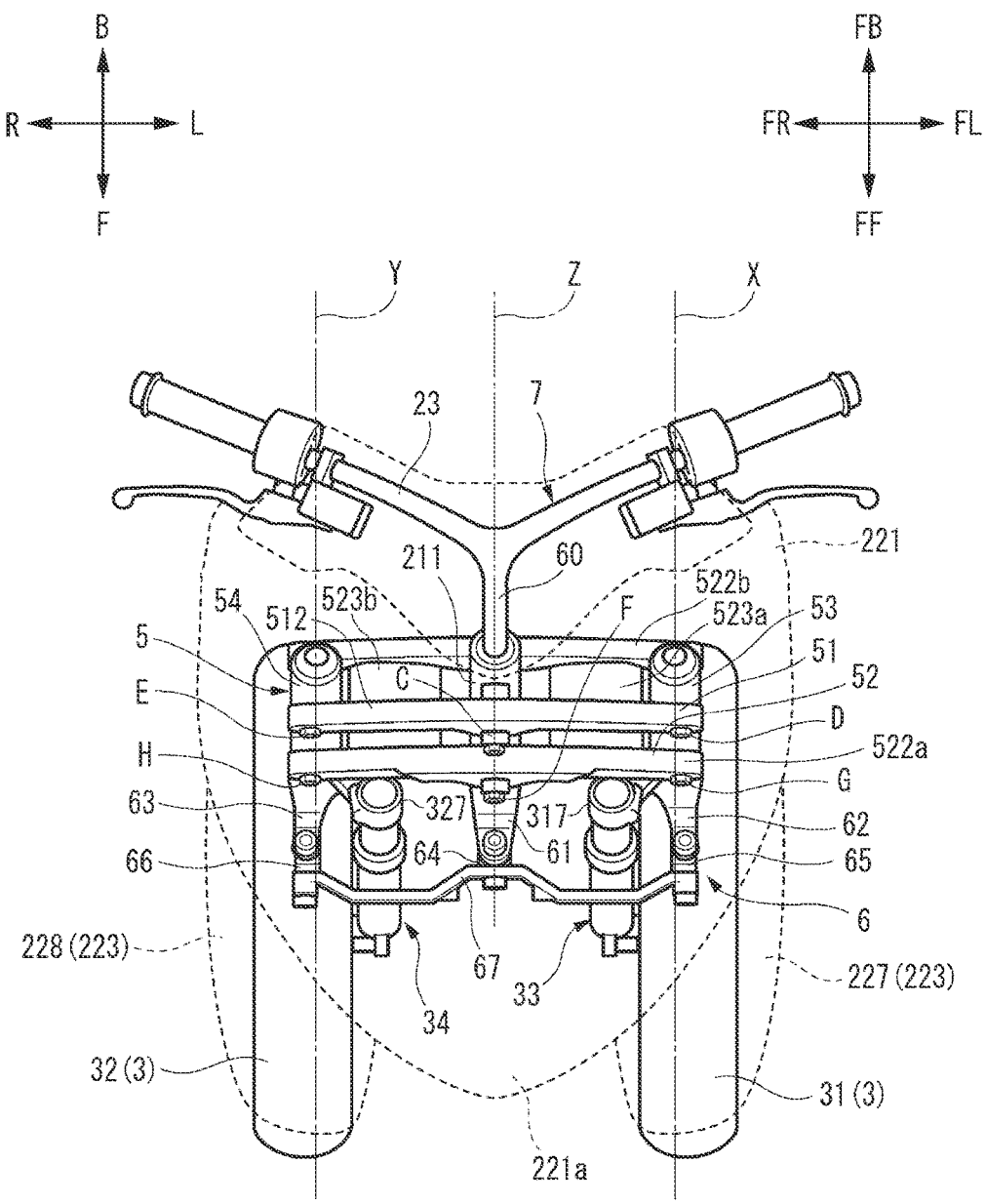
FIG. 3 is a plan view showing the front portion of the vehicle of FIG. 1.

FIG. 3 is a plan view of the front portion of the vehicle 1 as viewed from above the body frame 21. In FIG. 3, the body frame 21 is in the upright state. The following description which refers to FIG. 3 will be made on the premise that the body frame 21 is in the upright state. In FIG. 3, those elements shown therein are depicted as being seen through the front cover 221 and the pair of front fenders 223 which are shown by dashed lines.

As shown in FIG. 3, the lower cross member 52 includes a front plate member 522a and a rear plate member 522b. The front plate member 522a is disposed directly ahead of the head pipe 211. The rear plate member 522b is disposed directly behind the head pipe 211. The front plate member 522a and the rear plate member 522b extend in the left-right direction of the body frame 21. The front plate member 522a and the rear plate member 522b are connected together by the left connecting block 523a and the right connecting block 523b. The left connecting block 523a is disposed on the left of the head pipe 211. The right connecting block 523b is disposed on the right of the head pipe 211.

The lower cross member 52 is disposed below the upper cross member 51. A lengthwise dimension of the lower cross member 52 in relation to the left-right direction of the body frame 21 is exactly or almost the same as a lengthwise dimension of the upper cross member 51 in relation to the left-right direction of the body frame 21. The lower cross member 52 extends parallel to the upper cross member 51.

An intermediate portion of the lower cross member 52 is supported on the head pipe 211 by a support portion F. The lower cross member 52 turns about an intermediate lower axis which passes through the support portion F and extends in the front-rear direction of the body frame 21.

A left end portion of the lower cross member 52 is supported on the left side member 53 by a support portion G. The lower cross member 52 turns about a left lower axis which passes through the support portion G and extends in the front-rear direction of the body frame 21.

A right end portion of the lower cross member 52 is supported on the right side member 54 by a support portion H. The lower cross member 52 turns about a right lower axis which passes through the support portion H and extends in the front-rear direction of the body frame 21.

The intermediate upper axis, the right upper axis, the left upper axis, the intermediate lower axis, the right lower axis, and the left lower axis extend parallel to one another. The intermediate upper axis, the right upper axis, the left upper axis, the intermediate lower axis, the right lower axis, and the left lower axis are disposed above the left front wheel 31 and the right front wheel 32.

As shown in FIGS. 2 and 3, the left side member 53 is disposed directly on the left of the head pipe 211. The left side member 53 is disposed above the left front wheel 31. The left side member 53 extends in a direction in which the head pipe 211 extends. The left side member 53 extends in a direction in which the central turning axis Z of the steering shaft 60 extends. An upper portion of the left side member 53 is disposed behind a lower portion thereof.

The lower portion of the left side member 53 is connected to the left bracket 317. The left bracket 317 turns about a left center axis X relative to the left side member 53. The left center axis X extends in a direction in which the left side member 53 extends. As shown in FIG. 2, the left center axis X extends parallel to the central turning axis Z of the steering shaft 60 in the up-down direction of the body frame 21. As shown in FIG. 3, the left center axis X extends parallel to the central turning axis Z of the steering shaft 60 in the front-rear direction of the body frame 21.

As shown in FIGS. 2 and 3, the right side member 54 is disposed directly on the right of the head pipe 211. The right side member 54 is disposed above the right front wheel 32. The right side member 54 extends in the direction in which the head pipe 211 extends. The right side member 54 extends in the direction in which the central turning axis Z of the steering shaft 60 extends. An upper portion of the right side member 54 is disposed behind a lower portion thereof.

A lower portion of the right side member 54 is connected to the right bracket 327. The right bracket 327 turns about a right center axis Y relative to the right side member 54. The right center axis Y extends in a direction in which the right side member 54 extends. As shown in FIG. 2, the right center axis Y extends parallel to the central turning axis Z of the steering shaft 60 in the up-down direction of the body frame 21. As shown in FIG. 3, the right center axis Y extends parallel to the central turning axis Z of the steering shaft 60 in the front-rear direction of the body frame 21.

Thus, as has been described above, the upper cross member 51, the lower cross member 52, the left side member 53, and the right side member 54 are supported on the body frame 21 so that the upper cross member 51 and the lower cross member 52 are held in postures which are parallel to each other and so that the left side member 53 and the right side member 54 are held in postures which are parallel to each other.

As shown in FIGS. 2 and 3, the steering force transmitting mechanism 6 includes, in addition to the handlebar 23 and the steering shaft 60 which have been described above, an intermediate transmission plate 61, a left transmission plate 62, a right transmission plate 63, an intermediate joint 64, a left joint 65, a right joint 66, and a tie rod 67.

The intermediate transmission plate 61 is connected to the lower portion of the steering shaft 60. The intermediate transmission plate 61 cannot turn relatively to the steering shaft 60. The intermediate transmission plate 61 turns about the intermediate turning axis Z of the steering shaft 60 relative to the head pipe 211. A front portion of the intermediate transmission plate 61 is narrower in relation to a width in the left-right direction of the body frame 21 than a rear portion thereof.

The left transmission plate 62 is disposed directly on the left of the intermediate transmission plate 61. The left transmission plate 62 is connected to a lower portion of the left bracket 317. The left transmission plate 62 cannot turn relative to the left bracket 317. The left transmission plate 62 turns about the left center axis X relative to the left side member 53. A front portion of the left transmission plate 62 is narrower in relation to a width in the left-right direction of the body frame 21 than a rear portion thereof.

The right transmission plate 63 is disposed directly on the right of the intermediate transmission plate 61. The right transmission plate 63 is connected to a lower portion of the right bracket 327. The right transmission plate 63 cannot turn relatively to the right bracket 327. The right transmission plate 63 turns about the right center axis Y relative to the right side member 54. A front portion of the right transmission plate 63 is narrower in relation to a width in the left-right direction of the body frame 21 than a rear portion thereof.

As shown in FIG. 3, the intermediate joint 64 is connected to the front portion of the intermediate transmission plate 61 via a shaft which extends in the up-down direction of the body frame 21. The intermediate transmission plate 61 and the intermediate joint 64 turn relatively about the shaft portion. The left joint 65 is disposed directly on the left of the intermediate joint 64. The left joint 65 is connected to the front portion of the left transmission plate 62 via a shaft which extends in the up-down direction of the body frame. The left transmission plate 62 and the left joint 65 turn relatively about the shaft portion. The right joint 66 is disposed directly on the right of the intermediate joint 64. The right joint 66 is connected to the front portion of the right transmission plate 63 via a shaft which extends in the up-down direction of the body frame. The right transmission plate 63 and the right joint 66 turn relatively about the shaft portion.

A shaft portion which extends in the front-rear direction of the body frame 21 is provided at a front portion of the intermediate joint 64. A shaft portion which extends in the front-rear direction of the body frame 21 is provided at a front portion of the left joint 65. A shaft portion which extends in the front-rear direction of the body frame 21 is provided at a front portion of the right joint 66. The tie rod 67 extends in the left-right direction of the body frame 21. The tie rod 67 is connected to the intermediate joint 64, the left joint 65, and the right joint 66 via those shaft portions. The tie rod 67 and the intermediate joint 64 turn relatively about the shaft portion which is provided at the front portion of the intermediate joint 64. The tie rod 67 and the left joint 65 turn relatively about the shaft portion which is provided at the front portion of the left joint 65. The tie rod 67 and the right joint 66 turn relatively about the shaft portion which is provided at the front portion of the right joint 66.

Figure 4:
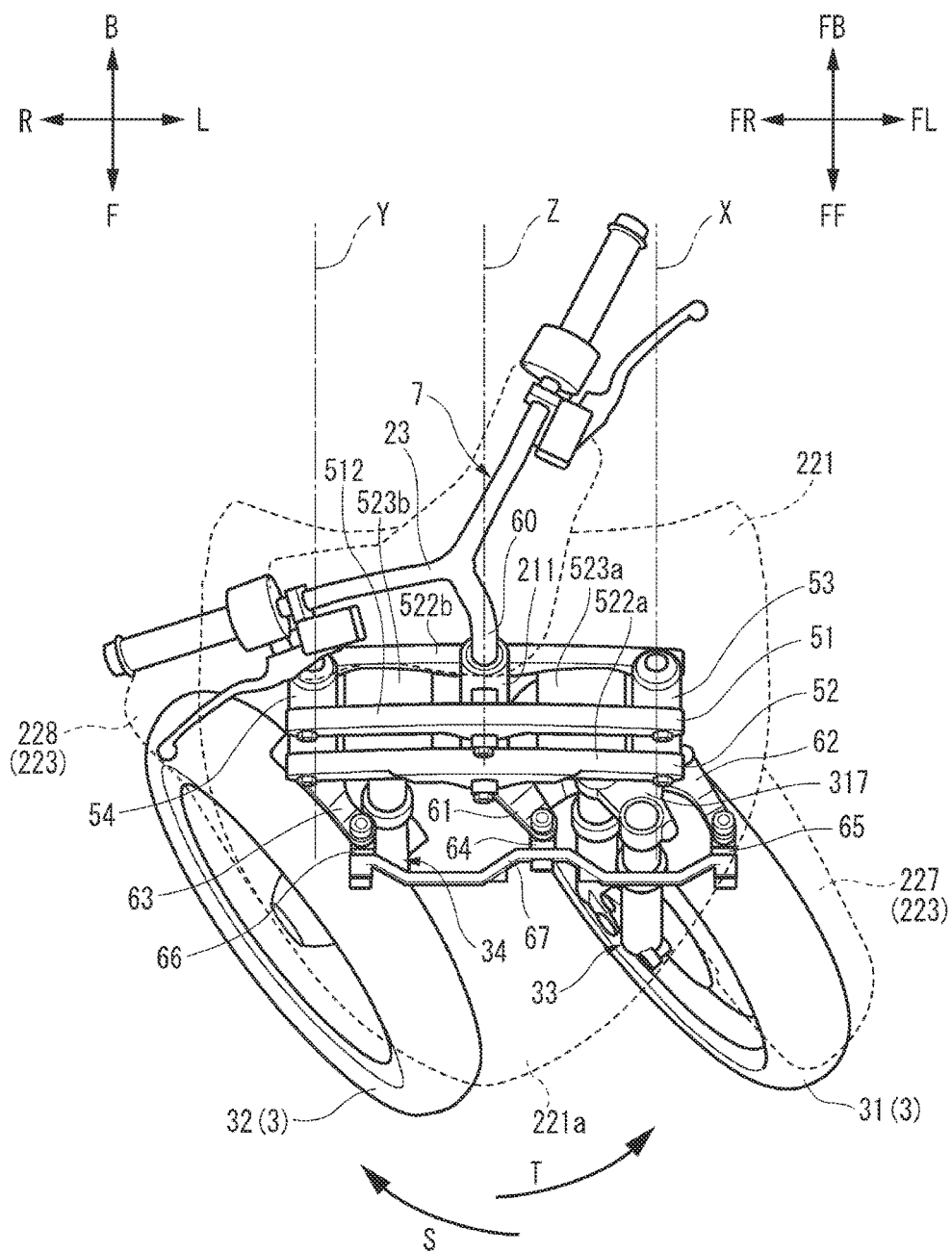
FIG. 4 is a plan view showing the front portion of the vehicle shown in FIG. 1 when the vehicle is steered.

Next, referring to FIGS. 3 and 4, a steering operation of the vehicle 1 will be described. FIG. 4 is a plan view of the front portion of the vehicle 1 under a condition that the left front wheel 31 and the right front wheel 32 turned to the left, as viewed from the above the body frame 21. In FIG. 4, those elements shown therein are depicted as being seen through the front cover 221 and the pair of front fenders 223 which are shown by dashed lines.

When the rider operates the handlebar 23, the steering shaft 60 turns about the central turning axis Z relative to the head pipe 211. When the handlebar 23 is turned to the left as shown in FIG. 4, the steering shaft 60 turns in a direction indicated by an arrow T. In association with the turning of the steering shaft 60, the intermediate transmission plate 61 turns in the direction indicated by the arrow T about the central turning axis Z relative to the head pipe 211.

In association with the turning of the intermediate transmission plate 61 in the direction indicated by the arrow T, the intermediate joint 64 of the tie rod 67 turns relative to the intermediate transmission plate 61 in a direction indicated by an arrow S. This moves the tie rod 67 rightwards and rearwards with its posture maintained as it is.

In association with the rightward and rearward movement of the tie rod 67, the left joint 65 and the right joint 66 of the tie rod 67 turn in the direction indicated by the arrow S relative to the left transmission plate 62 and the right transmission plate 63, respectively. This causes the left transmission plate 62 and the right transmission plate 63 to turn in the direction indicated by the arrow T while the tie rod 67 maintains its posture as it is.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorbing mechanism 33, which is connected to the left bracket 317 via the left inner tube 33b, turns in the direction indicated by the arrow T about the left center axis X relative to the left side member 53. When the left shock absorbing mechanism 33 turns in the direction indicated by the arrow T, the left front wheel 31, which is supported on the left shock absorbing mechanism 33 via the left supporting axle 314, turns in the direction indicated by the arrow T about the left center axis X relative to the left side member 53.

When the right bracket 327 turns in the direction indicated by the arrow T, the right shock absorbing mechanism 34, which is connected to the right bracket 327 via the right inner tube 34b, turns in the direction indicated by the arrow T about the right center axis Y relative to the right side member 54. When the right shock absorbing mechanism 34 turns in the direction indicated by the arrow T, the right front wheel 32, which is supported on the right shock absorbing mechanism 34 via the right supporting axle 324, turns in the direction indicated by the arrow T about the right center axis Y relative to the right side member 54.

When the rider operates the handlebar 23 so as to turn to the right, the elements described above turn in the direction indicated by the arrow S. Since the elements move the other way around in relation to the left-right direction, the detailed description thereof will be omitted here.

Thus, as has been described above, the steering force transmitting mechanism 6 transmits the steering force to the left front wheel 31 and the right front wheel 32 in response to the operation of the handlebar 23 by the rider. The left front wheel 31 and the right front wheel 32 turn about the left center axis X and the right center axis Y, respectively, in the direction corresponding to the direction in which the handlebar 23 is operated by the rider.

Figure 5:
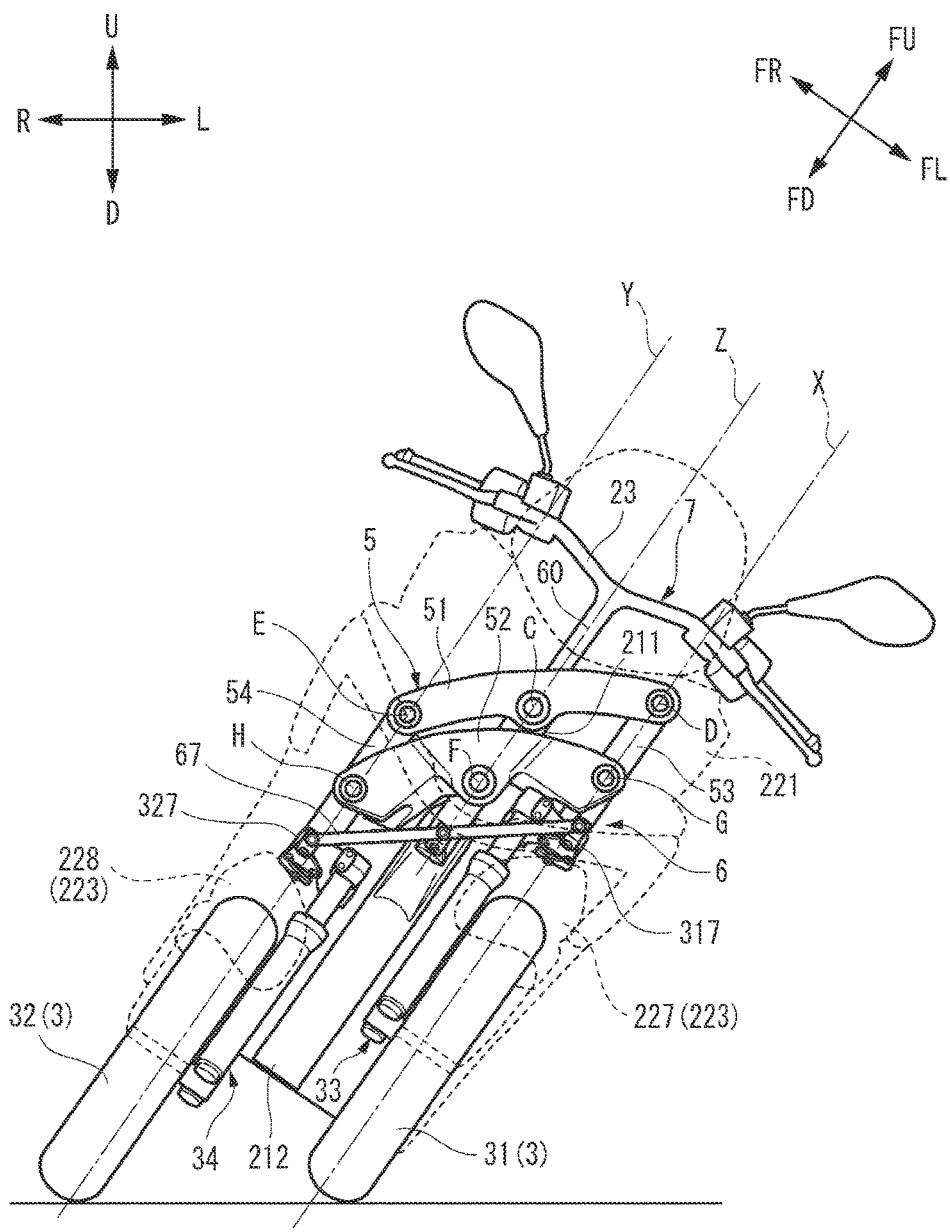
FIG. 5 is a front view showing the front portion of the vehicle shown in FIG. 1 when the vehicle is caused to lean.

Next, referring to FIGS. 2 and 5, a leaning operation of the vehicle 1 will be described. FIG. 5 is a front view of the front portion of the vehicle 1 as viewed from the front of the body frame 21 when the body frame 21 leans to the left of the vehicle 1. In FIG. 5, those elements shown therein are depicted as being seen through the front cover 221 and the pair of front fenders 223 which are shown by dashed lines.

As shown in FIG. 2, when the body frame 21 is in the upright state, when the vehicle 1 is viewed from the front of the body frame 21, the link mechanism 5 preferably has a rectangular or substantially rectangular shape. As shown in FIG. 5, with the body frame 21 leaning, when the vehicle 1 is viewed from the front of the body frame 21, the link mechanism 5 has a parallelogram shape. The deformation of the link mechanism 5 is associated with the leaning of the body frame 21 in the left-right direction of the vehicle 1. The operation of the link mechanism 5 means that the upper cross member 51, the lower cross member 52, the left side member 53, and the right side member 54 which define the link mechanism 5 turn relatively about the turning axes which pass through the corresponding support portions C to H, so that the shape of the link mechanism 5 changes.

For example, as shown in FIG. 5, when the rider causes the vehicle 1 to lean to the left, the head pipe 211 leans to the left from the vertical direction. When the head pipe 211 leans, the upper cross member 51 turns about the intermediate upper axis which passes through the support portion C counterclockwise as viewed from the front of the vehicle 1 relative to the head pipe 211. Similarly, the lower cross member 52 turns about the intermediate lower axis which passes through the support portion F counterclockwise as viewed from the front of the vehicle 1 relative to the head pipe 211. This causes the upper cross member 51 to move to the left relative to the lower cross member 52.

As the upper cross member 51 moves to the left, the upper cross member 51 turns about the left upper axis which passes through the support portion D and the right upper axis which passes through the support portion E counterclockwise as viewed from the front of the vehicle 1 relative to the left side member 53 and the right side member 54, respectively. Similarly, the lower cross member 52 turns about the left lower axis which passes through the support portion G and the right lower axis which passes through the support portion H counterclockwise as viewed from the front of the vehicle 1 relative to the left side member 53 and the right side member 54, respectively. This causes the left side member 53 and the right side member 54 to lean leftward in relation to the vertical direction while maintaining their postures that are parallel to the head pipe 211.

As this occurs, the lower cross member 52 moves to the left relative to the tie rod 67. As the lower cross member 52 moves to the left, the shaft portions which are provided at the respective front portions of the intermediate joint 64, the left joint 65 and the right joint 66 turn relative to the tie rod 67. This allows the tie rod 67 to hold a parallel posture to the upper cross member 51 and the lower cross member 52.

As the left side member 53 leans to the left, the left bracket 317 which is connected to the left side member 53 leans to the left. As the left bracket 317 leans to the left, the left shock absorbing mechanism 33 which is connected to the left bracket 317 leans to the left. As the left shock absorbing mechanism 33 leans to the left, the left front wheel 31 supported on the left shock absorbing mechanism 33 leans to the left while holding its posture parallel to the head pipe 211.

As the right side member 54 leans to the left, the right bracket 327 which is connected to the right side member 54 leans to the left. As the right bracket 327 leans to the left, the right shock absorbing mechanism 34 which is connected to the right bracket 327 leans to the left. As the right shock absorbing mechanism 34 leans to the left, the right front wheel 32 supported on the right shock absorbing mechanism 34 leans to the left while holding its posture parallel to the head pipe 211.

The leaning operations of the left front wheel 31 and the right front wheel 32 are described based on the vertical direction. However, when the vehicle 1 leans (when the link mechanism 5 is activated to operate), the up-down direction of the body frame 21 does not coincide with the vertical direction. In the event that the leaning operations are described based on the up-down direction of the body frame 21, when the link mechanism 5 is activated to operate, the relative positions of the left front wheel 31 and the right front wheel 32 to the body frame 21 change. In other words, the link mechanism 5 changes the relative positions of the left front wheel 31 and the right front wheel 32 to the body frame 21 in the up-down direction of the body frame 21 to cause the body frame 21 to lean relative to the vertical direction.

When the rider causes the vehicle 1 to lean to the right, the elements lean to the right. Since the elements move the other way around in relation to the left-right direction, the detailed description thereof will be omitted here.

Figure 6:
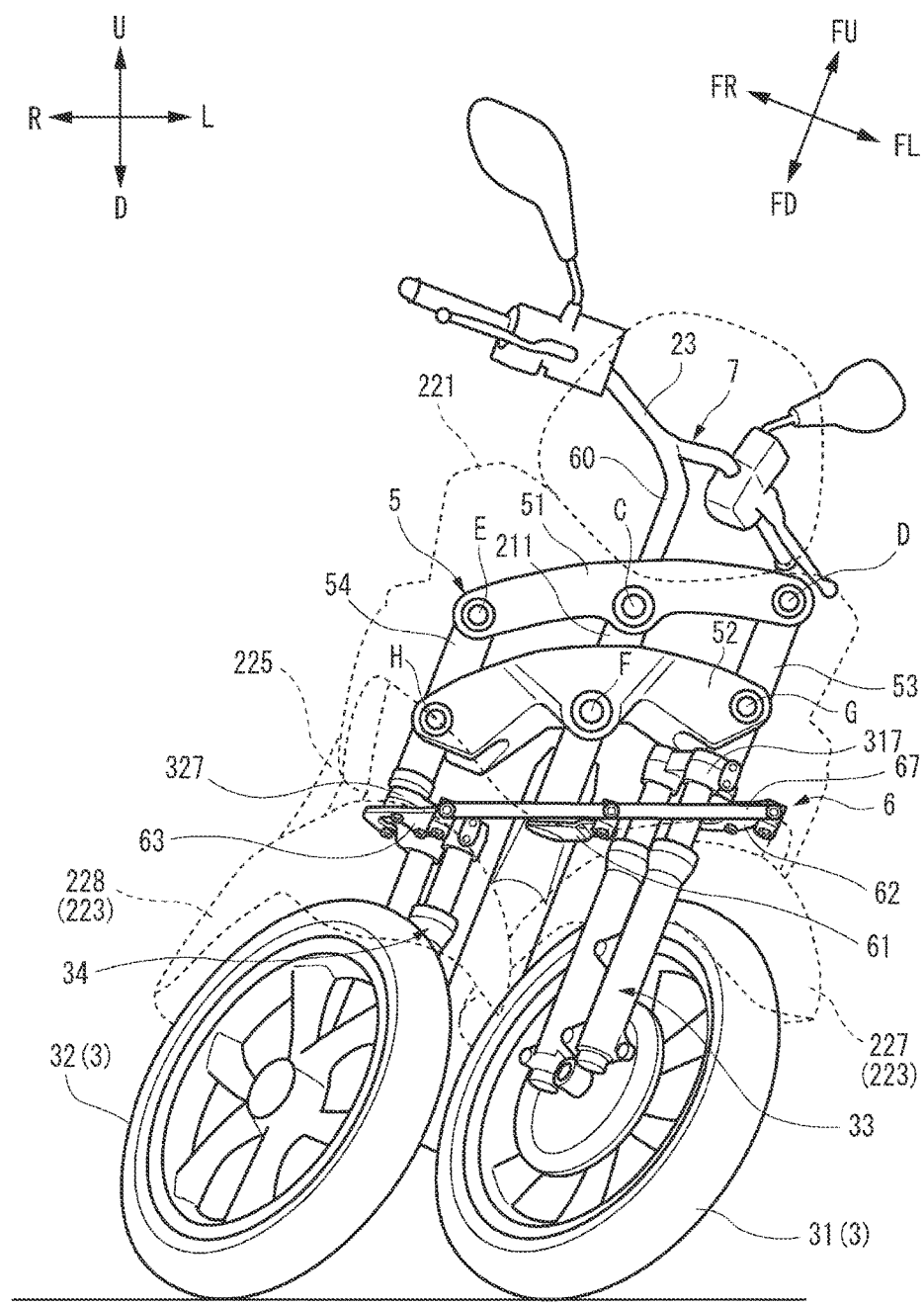
FIG. 6 is a front view showing the front portion of the vehicle shown in FIG. 1 when the vehicle is caused to lean and is steered.

FIG. 6 is a front view of the front portion of the vehicle with the vehicle 1 caused to lean and steered. FIG. 6 shows a state that the vehicle 1 is steered or turned to the left while leaning to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the link mechanism 5 exhibits the parallelogram shape, and the tie rod 67 moves toward the left rear from its position which takes when the body frame 21 is in the upright state.

Figure 7:
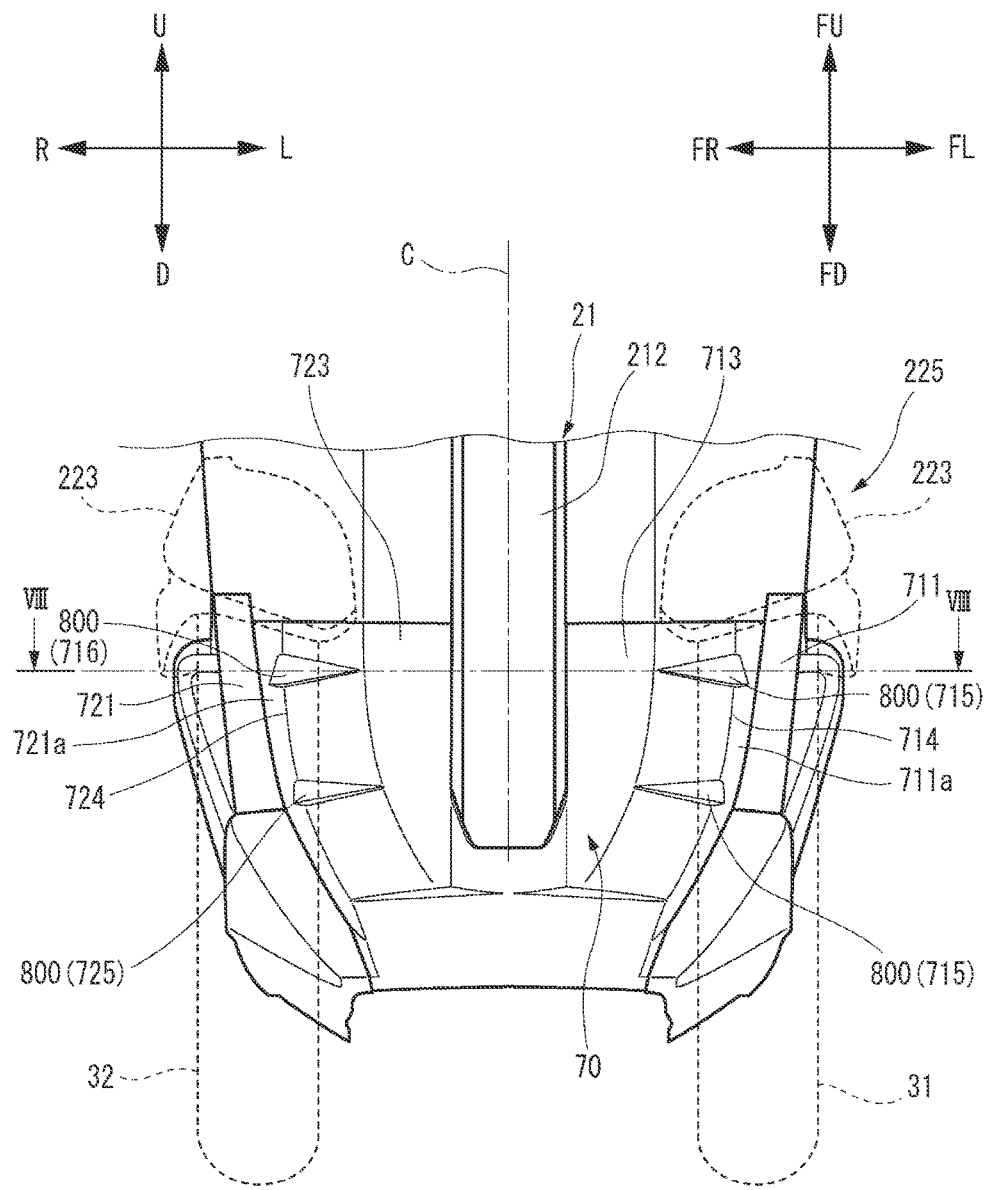
FIG. 7 is a front view partially showing the shape of an inner fender provided in the vehicle of FIG. 1.
Figure 8:
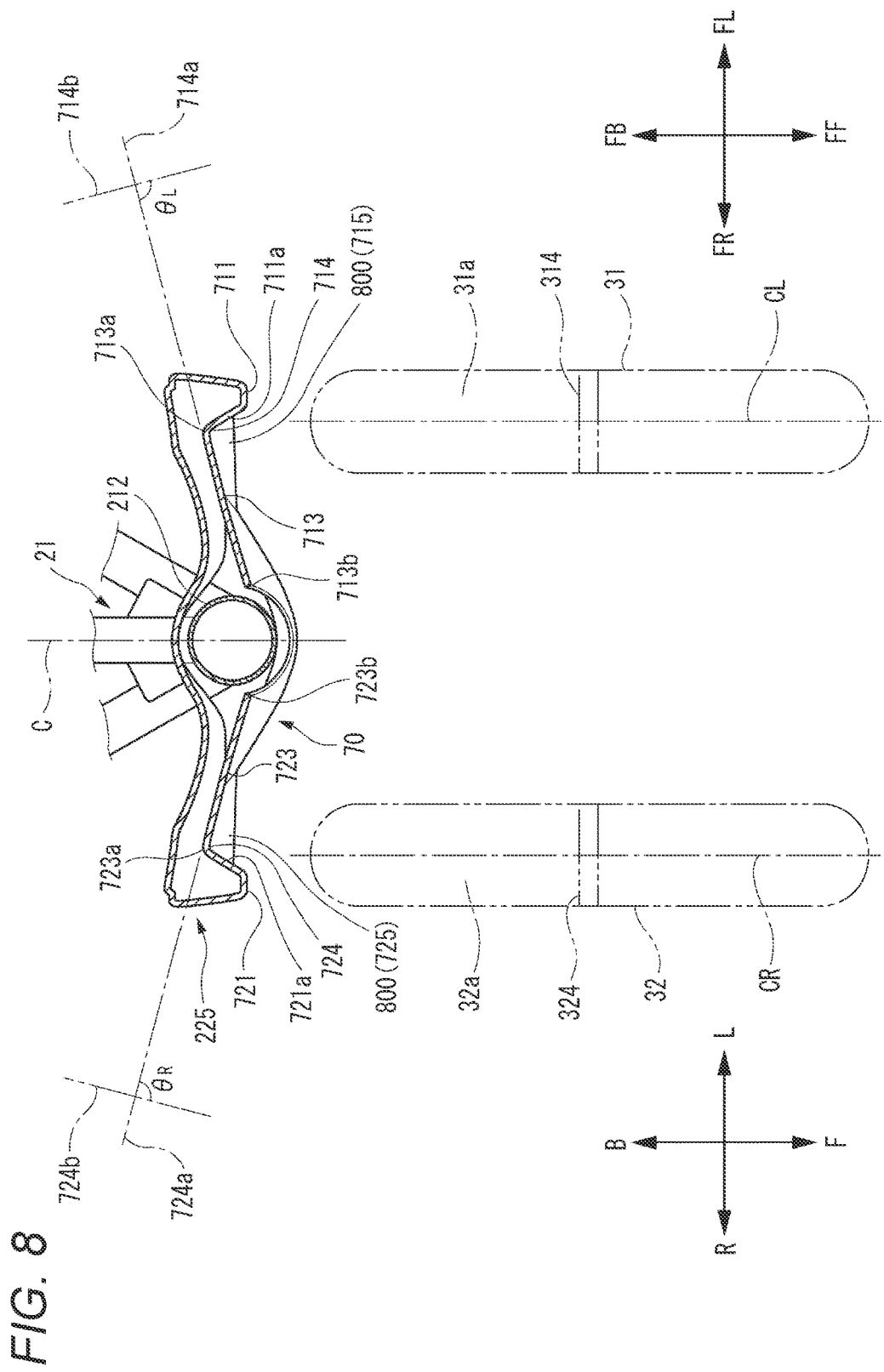
FIG. 8 is a plan view partially showing a cross section of the inner fender which is taken along a line VIII-VIII in FIG. 7.

Next, referring to FIGS. 7 and 8, the shape of the inner fender 225 provided in the vehicle 1 will be described in detail. FIG. 7 shows an external view of the front portion of the vehicle 1 as seen from the front in the front-rear direction of the body frame 21. In FIG. 7, those elements shown therein are depicted as being seen through the front cover 221 and the pair of front fenders 223 which are shown by dashed lines. FIG. 8 shows a portion of the inner fender 225 in section which is taken along a line VIII-VIII in FIG. 7. In FIG. 8, the positions of the left front wheel 31 and the right front wheel 32 relative to the inner fender 225 are indicated by dashed chain lines. FIGS. 7 and 8 show a state that the body frame 21 is in the upright state and that the left front wheel 31 and the right front wheel 32 are not turned by the steering device 7. When referred to herein, the "state in which the left front wheel 31 and the right front wheel 32 are not turned" means a state in which the orientation of a straight line CL that passes through a front end and a rear end of the left front wheel 31 and the orientation of a straight line CR that passes through a front end and a rear end of the right front wheel 32 shown in FIG. 8 coincide with the front-rear direction of the body frame 21. The following description that refers to FIGS. 7 and 8 will be made based on this state. In other words, the "state that the left front wheel 31 and the right front wheel 32 are not turned" denotes the state of the left front wheel 31 and the right front wheel 32 when the vehicle travels straight ahead. However, this state does not define whether the vehicle is moving or is stopped. This state includes not only a case where the vehicle is moving but also a case where the vehicle is stopped.

As shown in FIGS. 7 and 8, the inner fender 225 includes a cover surface 70. The cover surface 70 is disposed behind a rear edge 31a of the left front wheel 31 and a rear edge 32a of the right front wheel 32 in the front-rear direction of the body frame 21. When referred to herein, the "rear edge 31a of the left front wheel 31" means an outer circumferential surface of the left front wheel 31 that is located behind the left supporting axle 314 in the front-rear direction of the body frame 21. In addition, when referred to herein, the "rear edge 32a of the right front wheel 32" means an outer circumferential surface of the right front wheel 32 that is located behind the right supporting axle 324 in the front-rear direction of the body frame 21.

As shown in FIGS. 7 and 8, the inner fender 225 includes a left projecting portion 711. In the state shown in FIGS. 7 and 8, the left projecting portion 711 is disposed on the left of the center C of the vehicle 1 in the left-right direction of the body frame 21; on the right of a left end VL of the vehicle 1 (a left end of a left side rearview mirror 231 shown in FIG. 2 in this preferred embodiment) in the left-right direction of the body frame 21; and behind the rear edge 31a of the left front wheel 31 in the front-rear direction of the body frame 21. In the state shown in FIGS. 7 and 8, the left projecting portion 711 projects forward in the front-rear direction of the body frame 21 from the cover surface 70, and extends in the up-down direction of the body frame 21.

As shown in FIGS. 7 and 8, the inner fender 225 includes a right projecting portion 721. In the state shown in FIGS. 7 and 8, the right projecting portion 721 is disposed on the right of the center C of the vehicle 1 in the left-right direction of the body frame 21; on the left of a right end VR of the vehicle 1 (a right end of a right side rearview mirror 232 shown in FIG. 2 in this preferred embodiment) in the left-right direction of the body frame 21; and behind the rear edge 32a of the right front wheel 32 in the front-rear direction of the body frame 21. In the state shown in FIGS. 7 and 8, the right projecting portion 721 projects forward in the front-rear direction of the body frame 21 from the cover surface 70, and extends in the up-down direction of the body frame 21.

At least in the state shown in FIGS. 7 and 8, a portion of the cover surface 70 that is located between the left projecting portion 711 and the right projecting portion 721 faces a space defined between the left front wheel 31 and the right front wheel 32.

The inventors studied in detail the reason for the occurrence of the phenomenon of the leg portions of the rider being splashed with water scattered by the two front wheels. As a result, the following phenomenon was discovered and confirmed.

Water scattered by the left front wheel and the right front wheel while the vehicle is running adheres to the inner fender that is disposed behind the rear edges of the two front wheels. A portion of the water adhering to the inner fender is pushed to move to the left end portion of the inner fender by the airflow that passes between the rear edge of the left front wheel and the inner fender by way of the space defined between the left front wheel and the right front wheel. The water that has moved is taken by the airflow that flows rearward along an area directly on the left of the vehicle, and is scattered rearward from the left end portion of the inner fender. The water has been scattered splashes the leg portions and the like of the rider who is sitting on the seat that is disposed behind the left front wheel. Similarly, a portion of the water adhering to the inner fender is pushed to move to the right end portion of the inner fender by the airflow that passes between the rear edge of the right front wheel and the inner fender by way of the space defined between the left front wheel and the right front wheel. The water that has moved is taken by the airflow that flows rearward along an area directly on the right of the vehicle, and is scattered rearward from the right end portion of the inner fender. The water that has been scattered splashes the leg portions and the like of the rider who is sitting on the seat that is disposed behind the right front wheel.

Namely, in the vehicle including the leanable body frame and the two front wheels that are arranged side by side in the left-right direction of the body frame, the occurrence of the phenomenon described above is attributed to the occurrence of the airflow that passes between the rear edge of the left front wheel and the inner fender by way of the space defined between the left front wheel and the right front wheel and the airflow that passes between the rear edge of the right front wheel and the inner fender by way of the space defined between the left front wheel and the right front wheel. In other words, the phenomenon described above is a specific phenomenon to a vehicle including a leanable body frame and two front wheels arranged side by side in the left-right direction of the body frame. Then, the inventors conceived projecting the shield in the left-right direction that covers the front surfaces of the leg portions of the rider sitting on the seat to block drops of water scattered rearward. However, the shield needs to project a large amount to obtain the designed effect, resulting in an increase in size of the vehicle.

Then, the inventors discovered a configuration that significantly reduces or prevents the amount of water that flows rearward of such a vehicle 1 while reducing the size thereof. As a result of the study, the inventors conceived and developed a construction in which the left projecting portion 711 blocks the movement of the water adhering to the inner fender 225 as a result of being pushed by the airflow that passes between an area behind the left front wheel 31 and the inner fender 225, and the right projecting portion 721 blocks the movement of water adhering to the inner fender 225 as a result of being pushed by the airflow that passes between an area behind the right front wheel 32 and the inner fender 225 are caused to project to an area ahead of the inner fender 225.

Specifically, the inner fender 225 includes the cover surface 70 that is disposed behind the rear edge 31a of the left front wheel 31 and the rear edge 32a of the right front wheel 32 in the front-rear direction of the body frame 21 in such a state that the body frame 21 is in the upright state and that the left front wheel 31 and the right front wheel 32 are not turned by the steering device 7. In addition, the inner fender 225 includes the left projecting portion 711 that is disposed on the left of the center C of the vehicle 1 in the left-right direction of the body frame 21; on the right of the left end VL of the vehicle 1 in the left-right direction of the body frame 21; and behind the rear edge 31a of the left front wheel 31 in the front-rear direction of the body frame 21 and that extends in the up-down direction of the body frame 21 while projecting from the cover surface 70 forward in the front-rear direction of the body frame 21 in such a state that the body frame 21 is in the upright state and that the left front wheel 31 and the right front wheel 32 are not turned by the steering device 7, and the right projecting portion 721 that is disposed on the right of the center C of the vehicle 1 in the left-right direction of the body frame 21; on the left of the right end VR of the vehicle 1 in the left-right direction of the body frame 21; and behind the rear edge 32a of the right front wheel 32 in the front-rear direction of the body frame 21 and that extends in the up-down direction of the body frame 21 while projecting from the cover surface 70 forward in the front-rear direction of the body frame 21 in such a state that the body frame 21 is in the upright state and that the left front wheel 31 and the right front wheel 32 are not turned by the steering device 7. Further, at least in such a state that the body frame 21 is in the upright state and that the left front wheel 31 and the right front wheel 32 are not turned by the steering device 7, a portion of the cover surface 70 that is located between the left projecting portion 711 and the right projecting portion 721 faces the space defined between the left front wheel 31 and the right front wheel 32.

According to this configuration, a portion of the water that was scattered by the left front wheel 31 and the right front wheel 32 and that has passed through the space defined between the left front wheel 31 and the right front wheel 32 adheres to the portion of the cover surface 70 which is located between the left projecting portion 711 and the right projecting portion 721. A portion of the water that has adhered to the cover surface 70 is pushed to move towards the left end portion of the inner fender 225 by the airflow that passes between the rear edge 31a of the left front wheel 31 and the inner fender 225 by way of the space defined between the left front wheel 31 and the right front wheel 32. However, the water moved is significantly reduced or prevented from reaching the left end portion by the left projecting portion 711. In addition, a portion of the water that has adhered to the cover surface 70 is pushed to move towards the right end portion of the inner fender 225 by the airflow that passes between the rear edge 32a of the right front wheel 32 and the inner fender 225 by way of the space defined between the left front wheel 31 and the right front wheel 32. However, the water moved is significantly reduced or prevented from reaching the right end portion by the right projecting portion 721.

Further, by providing the left projecting portion 711 and the right projecting portion 721 in the manner described above, compared with a construction in which the inner fender 225 is not provided with such projecting portions and is open in the left-right direction, it was discovered that an airflow that flows toward an area directly below the vehicle 1 along the cover surface 70 at high speeds is formed in a space defined between the two projecting portions. The water that has adhered to the cover surface 70 is not only blocked from moving to the left end portion and the right end portion of the inner fender 225 by the left projecting portion 711 and the right projecting portion 721 but also is guided to an area directly below the vehicle 1 by the high-speed airflow that is formed between the two projecting portions. Consequently, the amount of water which is scattered rearward by way of the left and right end portions of the inner fender 225 is significantly reduced or prevented.

Since it is not necessary to provide structures that extend in the left-right direction of the body frame 21 such as the shield to obtain the effect described above, it is possible to reduce the size of the vehicle.

Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

As shown in FIGS. 7 and 8, the left projecting portion 711 includes a right side surface 711a that is oriented rightward in the left-right direction of the body frame 21. The right side surface 711a and the cover surface 70 define a left bent portion 714 that extends in the up-down direction of the body frame 21. More specifically, the cover surface 70 includes a left cover surface 713. The left cover surface 713 is disposed on the left of the center C of the vehicle in the left-right direction of the body frame 21 in such a state that the body frame 21 is in the upright state and that the left front wheel 31 and the right front wheel 32 are not turned by the steering device 7. The left bent portion 714 is defined by the left cover surface 713 and the right side surface 711a of the left projecting portion 711.

As shown in FIGS. 7 and 8, the right projecting portion 721 includes a left side surface 721a that is oriented leftward in the left-right direction of the body frame 21. The left side surface 721a and the cover surface 70 define a right bent portion 724 that extends in the up-down direction of the body frame 21. More specifically, the cover surface 70 includes a right cover surface 723. The right cover surface 723 is disposed on the right of the center C of the vehicle 1 in the left-right direction of the body frame 21, in such a state that the body frame 21 is in the upright state and that the left front wheel 31 and the right front wheel 32 are not turned by the steering device 7. The right bent portion 724 is defined by the right cover surface 723 and the left side surface 721a of the right projecting portion 721.

Namely, the "bent portion" means a portion that is defined as a result of two planes that extend in different directions intersect each other in a cross-sectional plane that includes the front-rear direction and left-right direction of the body frame 21. The "bent portion" should be distinguished from a continuously curved surface.

According to this configuration, it is possible to significantly reduce or prevent the occurrence of a phenomenon that the water pushed by the airflow that passes between the rear edge 31a of the left front wheel 31 and the inner fender 225 by way of the space defined between the left front wheel 31 and the right front wheel 32 rides over the left projecting portion 711. In addition, it is possible to significantly reduce or prevent the occurrence of a phenomenon that the water pushed by the airflow that passes between the rear edge 32a of the right front wheel 32 and the inner fender 225 by way of the space defined between the left front wheel 31 and the right front wheel 32 rides over the right projecting portion 721. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

An angle θL defined by the left bent portion 714 preferably is no less than about 45 degrees and no greater than about 135 degrees, for example. Here, the "angle θL defined by the left bent portion 714" is defined as follows. FIG. 8 shows a cross-sectional view of the inner fender 225 taken along the front-rear direction and left-right direction of the body frame 21. In the cross section, chain lines 714a correspond to a straight line that extends parallel to the left cover surface 713. Chain lines 714b correspond to a straight line that extends parallel to the right side surface 711a of the left projecting portion 711. The angle θL is an angle that is defined by the two straight lines at an area directly ahead of the straight line 714a and directly on the right of the straight line 714b. In other words, the angle θL is an angle defined by the two straight lines at an area directly ahead of the straight line 714a that extends parallel to one of the two planes defining the left bent portion 714 which is located more posterior in the front-rear direction of the body frame 21, and directly on the right of the straight line 714b that extends parallel to the other one of the two planes that is located more anterior in the front-rear direction.

An angle θR defined by the right bent portion 724 preferably is no less than about 45 degrees and no greater than about 135 degrees, for example. Here, the "angle θR defined by the right bent portion 724" is defined as follows. In the cross section of the inner fender 225 shown in FIG. 8, chain lines 724a correspond to a straight line that extends parallel to the right cover surface 723. Chain lines 724b correspond to a straight line that extends parallel to the left side surface 721a of the right projecting portion 721. The angle θR is an angle that is defined by the two straight lines at an area directly ahead of the straight line 724a and directly on the left of the straight line 724b. In other words, the angle θR is an angle defined by the two straight lines at an area directly ahead of the straight line 724a that extends parallel to one of the two planes defining the right bent portion 724 which is located more posterior in the front-rear direction of the body frame 21, and directly on the left of the straight line 724b that extends parallel to the other one of the two planes that is located more anterior in the front-rear direction.

According to this configuration, the water that is pushed by the airflow that passes between the rear edge 31a of the left front wheel 31 and the inner fender 225 by way of the space defined between the left front wheel 31 and the right front wheel 32 is easily held on the right side surface 711a of the left projecting portion 711, thus making it possible to significantly reduce or prevent the occurrence of a phenomenon that the water rides over the left projecting portion 711. In addition, the water that is pushed by the airflow that passes between the rear edge 32a of the right front wheel 32 and the inner fender 225 by way of the space defined between the left front wheel 31 and the right front wheel 32 is easily held on the left side surface 721a of the right projecting portion 721, thus making it possible to significantly reduce or prevent the occurrence of a phenomenon that the water rides over the right projecting portion 721. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

In the state shown in FIGS. 7 and 8, the left projecting portion 711 is disposed directly behind the left front wheel 31 in the front-rear direction of the body frame 21.

In the state shown in FIGS. 7 and 8, the right projecting portion 721 is disposed directly behind the right front wheel 32 in the front-rear direction of the body frame 21.

The airflow that passes between the rear edge 31a of the left front wheel 31 and the inner fender 225 byway of the space defined between the left front wheel 31 and the right front wheel 32 increases its speed at an area directly behind the left front wheel 31. By disposing the left projecting portion 711 at that location, the water that is pushed by the high-speed airflow to move is blocked by the left projecting portion 711 effectively. Similarly, the airflow that passes between the rear edge 32a of the right front wheel 32 and the inner fender 225 by way of the space defined between the left front wheel 31 and the right front wheel 32 increases its speed at an area directly behind the right front wheel 32. By disposing the right projecting portion 721 at that location, the water that is pushed by the high-speed airflow is blocked by the right projecting portion 721 effectively. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

As shown in FIGS. 7 and 8, in such a state that the body frame 21 is in the upright state and that the left front wheel 31 and the right front wheel 32 are not turned by the steering device 7, a left end portion 713a (an example of a left portion of the left cover surface) of the left cover surface 713 is disposed behind a right end portion 713b (an example of a right portion of the left cover surface) of the left cover surface 713 in the front-rear direction of the body frame 21. The left projecting portion 711 is located adjacent to the left end portion 713a of the left cover surface 713.

As shown in FIGS. 7 and 8, in such a state that the body frame 21 is in the upright state and that the left front wheel 31 and the right front wheel 32 are not turned by the steering device 7, a right end portion 723a (an example of a right portion of the right cover surface) of the right cover surface 723 is disposed behind a left end portion 723b (an example of a left portion of the right cover surface) of the right cover surface 723 in the front-rear direction of the body frame 21. The right projecting portion 721 is located adjacent to the right end portion 723a of the right cover surface 723.

According to this configuration, since the left end portion 713a of the left cover surface 713 is disposed behind the right end portion 713b, the water adhering to the left cover surface 713 is pushed to move rearward by the airflow that passes between the rear edge 31a of the left front wheel 31 and the inner fender 225 by way of the space defined between the left front wheel 31 and the right front wheel 32. Since the water pushed by the airflow is moving rearward, the water has difficulty in riding over the left projecting portion 711 that project forward. In addition, since the right end portion 723a of the right cover surface 723 is disposed behind the left end portion 723b, the water adhering to the right cover surface 723 is pushed to move rearward by the airflow that passes between the rear edge 32a of the right front wheel 32 and the inner fender 225 by way of the space defined between the left front wheel 31 and the right front wheel 32. Since the water pushed by the airflow is moving rearward, the water has difficulty in riding over the right projecting portion 721 that project forward. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 smaller in size.

Figure 9:
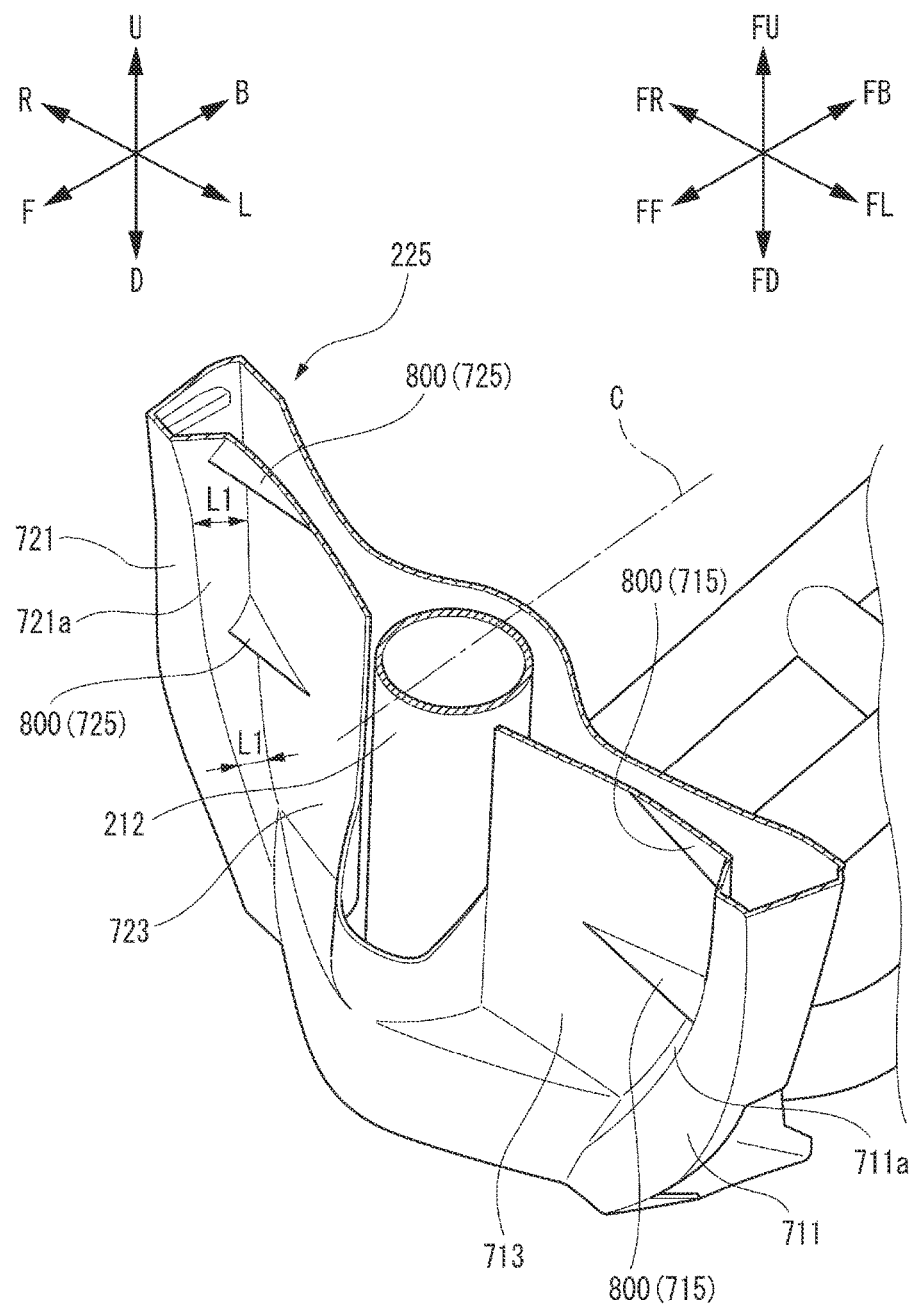
FIG. 9 is a perspective view partially showing the shape of the inner fender.

FIG. 9 is a perspective view showing a portion of the inner fender 225. A cross section shown in the figure corresponds to the cross section shown in FIG. 8. In FIG. 9, the body frame 21 including the down frame 212 is in the upright state. The following description that refers to FIG. 9 will be made based on this state.

As shown in FIG. 9, a projecting amount L1 of the right projecting portion 721 from the cover surface 70 increases as the right projecting portion 721 extends upwards in the up-down direction of the body frame 21. Similarly, a projecting amount of the left projecting portion 711 from the cover surface 70 also increases as the left projecting portion 711 extends upwards in the up-down direction of the body frame 21.

According to this configuration, it is difficult for the water moving on the cover surface 70 to ride over the left projecting portion 711, as a result of being pushed by the airflow that passes between the rear edge 31a of the left front wheel 31 and the inner fender 225 by way of the space defined between the left front wheel 31 and the right front wheel 32. In addition, it is difficult for the water moving on the cover surface 70 to ride over the right projecting portion 721, as a result of being pushed by the airflow that passes between the rear edge 32a of the right front wheel 32 and the inner fender 225 by way of the space defined between the left front wheel 31 and the right front wheel 32. Further, it is possible to enhance the effect of guiding the water adhering to the cover surface 70 toward an area directly below the vehicle 1 by the airflow that is produced between the left projecting portion 711 and the right projecting portion 721. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

As shown in FIGS. 7 to 9, the vehicle 1 includes a wall portion 800. The wall portion 800 projects from the cover surface 70 forward in the front-rear direction of the body frame 21 between the left projecting portion 711 and the right projecting portion 721. The wall portion 800 extends in the left-right direction of the body frame 21.

According to this configuration, the water adhering to the inner fender 225 is blocked from moving upwards by the wall portion 800. This enhances the effect of guiding the water adhering to the inner fender 225 toward an area directly below the vehicle 1 by the airflow that is produced between the left projecting portion 711 and the right projecting portion 721. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

As shown in FIGS. 8 and 9, the projecting amount of the left projecting portion 711 and the right projecting portion 721 from the cover surface 70 is greater than the projecting amount of the wall portion 800 from the cover surface 70.

According to this configuration, it is possible to significantly reduce or prevent the occurrence of a phenomenon that the water that has adhered to the inner fender 225 and was blocked from moving upwards by the wall portion 800 rides over the left projecting portion 711 and the right projecting portion 721 to reach the left and right sides of the vehicle 1. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

As shown in FIGS. 7 to 9, the wall portion 800 includes a pair of left wall portions 715 and a pair of right wall portions 725. In the state shown in FIGS. 7 and 8, the pair of left wall portions 715 is disposed on the left of the center C of the vehicle 1 in the left-right direction of the body frame 21. The pair of left wall portions 715 is arranged side by side in the up-down direction of the body frame 21. The pair of right wall portions 725 is disposed on the right of the center C of the vehicle 1 in the left-right direction of the body frame 21. In the state shown in FIGS. 7 and 8, the pair of right wall portions 725 is arranged side by side in the up-down direction of the body frame 21. Left end portions of the pair of left wall portions 715 are in contact with the right side surface 711a of the left projecting portion 711. Right end portions of the pair of right wall portions 725 are in contact with the left side surface 721a of the right projecting portion 721.

According to this configuration, the water adhering to the inner fender 225 and blocked from moving upwards by the left wall portions 715 is allowed to move easily downwards along the right side surface 711a by an airflow that is produced between the left projecting portion 711 and the right projecting portion 721. Similarly, the water adhering to the inner fender and blocked from moving upwards by the right wall portions 725 is allowed to move easily downwards along the left side surface 721a by the airflow that is produced between the left projecting portion 711 and the right projecting portion 721. This significantly reduces or prevents the occurrence of the phenomenon that the water adhering to the inner fender 225 rides over the left projecting portion 711 and the right projecting portion 721 to reach the left and right sides of the vehicle 1. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

Figure 10:
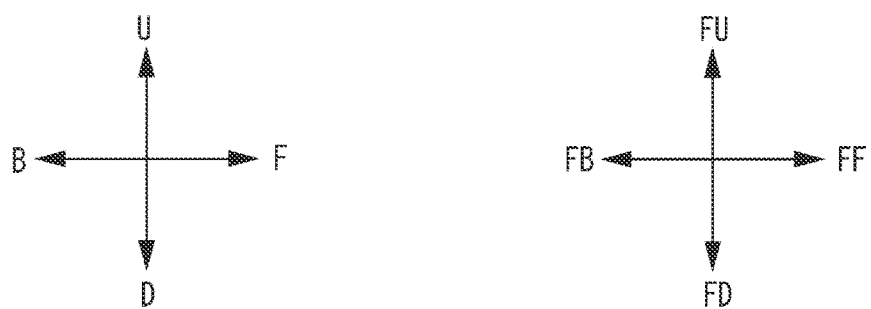
FIG. 10 is a right side view showing a cross sectional shape of a wall portion provided in the inner fender.
Figure 10:
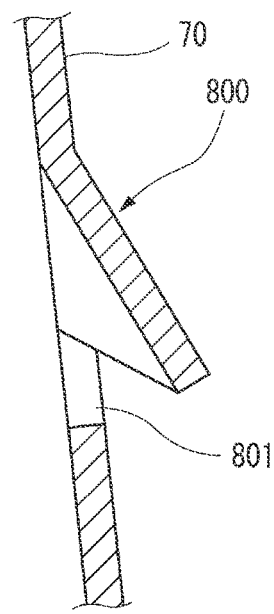

FIG. 10 is a right side view showing a vertical section view of the wall portion 800. In FIG. 10, the body frame 21, not shown, is in the upright state. The following description that refers to FIG. 10 will be made based on this state. The wall portion 800 projects from the cover surface 70 in such a way as to be inclined downwards in the up-down direction of the body frame 21.

According to this configuration, it is possible to block the water adhering to the inner fender 225 from moving upwards. This enhances the effect of guiding the water adhering to the inner fender 225 toward an area directly below the vehicle by the airflow that is produced between the left projecting portion 711 and the right projecting portion 721. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

As shown in FIG. 10, an opening 801 is provided directly below the wall portion 800 so as to penetrate the cover surface 70.

According to this configuration, the water adhering to the inner fender 225 and blocked from moving upwards by the wall portion 800 is guided into the opening 801. The water that has entered the opening 801 flows along the inner fender 225 and drops toward an area directly below the vehicle 1. This significantly reduces or prevents the amount of water that would be able to ride over the left projecting portion 711 and the right projecting portion 721 to reach the right and left sides of the vehicle 1. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 small in size.

The preferred embodiments described heretofore are intended to facilitate the understanding of the present invention and are not intended to limit the present invention. The preferred embodiments of the present invention can be modified or improved without departing from the scope thereof and that their equivalents can be also included in the present invention.

In the above preferred embodiments, in the state shown in FIGS. 7 and 8, the portion of the cover surface 70 that is located between the left projecting portion 711 and the right projecting portion 721 preferably faces the space defined between the left front wheel 31 and the right front wheel 32. In that state, however, a configuration may be used in which the entire cover surface 70 that is located between the left projecting portion 711 and the right projecting portion 721 faces the space defined between the left front wheel 31 and the right front wheel 32.

In the above preferred embodiments, the left projecting portion 711 and the right projecting portion 721 are preferably provided at the left end portion and the right end portion of the inner fender 225, respectively. However, the left projecting portion 711 and the right projecting portion 721 may be disposed in arbitrary positions on the inner fender 225 if at least a portion of the cover surface 70 that is located between the left projecting portion 711 and the right projecting portion 721 faces the space defined between the left front wheel 31 and the right front wheel 32 in the state shown in FIGS. 7 and 8.

In the above preferred embodiments, in the state shown in FIGS. 7 and 8, the portion of the left projecting portion 711 is preferably located directly behind the left front wheel 31 in the front-rear direction of the body frame 21. In that state, however, a configuration may be used in which the entire left projecting portion 711 is located directly behind the left front wheel 31. Alternatively, in that state, a configuration may be used in which the entire left projecting portion 711 is located on the right or left of the left front wheel 31.

In the state shown in FIGS. 7 and 8, the portion of the right projecting portion 721 is preferably located directly behind the right front wheel 32 in the front-rear direction of the body frame 21. In that state, however, a configuration may be used in which the entire right projecting portion 721 is located directly behind the right front wheel 32. Alternatively, a configuration may be used in which the entire right projecting portion 721 is located on the right or left of the right front wheel 31.

In the above preferred embodiments, the single left bent portion 714 is provided between the front end of the left projecting portion 711 and the cover surface 70. However, a configuration may be used in which a plurality of left bent portions 714 are provided. A curved portion may be provided at a portion where two planes that define the left bent portions 714 intersect each other in a cross-sectional plane that includes the front-rear direction and left-right direction of the body frame 21.

In the above preferred embodiments, the single right bent portion 724 is provided between the front end of the right projecting portion 721 and the cover surface 70. However, a configuration may be used in which a plurality of right bent portions 724 are provided. A curved portion may be provided at a portion where two planes that define the right bent portions 724 intersect each other in a cross-sectional plane that includes the front-rear direction and left-right direction of the body frame 21.

In the above preferred embodiments, in the left cover surface 713, the left end portion 713a is preferably disposed behind the right end portion 713b in the front-rear direction of the body frame 21. However, as long as the left bent portion 714 is provided, the shape and position of the left cover surface 713 can be determined as required. For example, the left cover surface 713 may extend parallel to the left-right direction of the body frame 21. Alternatively, the left cover surface 713 may be configured such that the left end portion 713a is disposed ahead of the right end portion 713b in the front-rear direction of the body frame 21.

In the above preferred embodiments, in the right cover surface 723, the right end portion 723a is preferably disposed behind the left end portion 723b in the front-rear direction of the body frame 21. However, as long as the right bent portion 724 is provided, the shape and position of the right cover surface 723 can be determined as required. For example, the right cover surface 723 may extend parallel to the left-right direction of the body frame 21. Alternatively, the right cover surface 723 may be configured such that the right end portion 723a is disposed ahead of the left end portion 723b in the front-rear direction of the body frame 21.

In the above preferred embodiments, the pair of left wall portions 715 are preferably provided. However, a configuration may be used in which a single left wall portion 715 is provided or a configuration may be used in which three or more left wall portions 715 are arranged side by side in the up-down direction of the body frame 21. In this case, the left wall portions 715 do not have to be aligned in relation to their positions in the left-right direction of the body frame 21.

In the above preferred embodiments, the pair of right wall portions 725 are preferably provided. However, a configuration may be used in which a single right wall portion 725 is provided or a configuration may be used in which three or more right wall portions 725 are arranged side by side in the up-down direction of the body frame 21. As this occurs, the right wall portions 725 do not have to be aligned in relation to the left-right direction of the body frame 21.

In the above preferred embodiments, the left shock absorbing mechanism 33 and the right shock absorbing mechanism 34 each preferably include the pair of telescopic mechanisms. However, the left shock absorbing mechanism 33 and the right shock absorbing mechanism 34 may each include a single telescopic mechanism.

In the above preferred embodiments, the vehicle 1 preferably includes the single rear wheel 4. However, a plurality of rear wheels may be provided.

In the above preferred embodiments, the center of the rear wheel 4 in relation to the left-right direction of the body frame 21 preferably coincides with the center of the distance defined between the left front wheel 31 and the right front wheel 32 in relation to the left-right direction of the body frame 21. Although the configuration described above is preferable, the center of the rear wheel 4 in relation to the left-right direction of the body frame 21 may not coincide with the center of the distance defined between the left front wheel 31 and the right front wheel 32 in relation to the left-right direction of the body frame 21.

In the above preferred embodiments, the link mechanism 5 preferably includes the upper cross member 51 and the lower cross member 52. However, the link mechanism 5 may include a cross member other than the upper cross member 51 and the lower cross member 52. The "upper cross member" and the "lower cross member" are merely so called based on their relative positions in relation to the up-down direction. The upper cross member does not necessarily mean an uppermost cross member in the link mechanism 5. The upper cross member means a cross member which lies above another cross member which lies therebelow. The lower cross member does not necessarily mean a lowermost cross member in the cross mechanism 5. The lower cross member means a cross member which lies below another cross member which lies thereabove. At least one of the upper cross member 51 and the lower cross member 52 may be made up of two portions such as a right cross member and a left cross member. In this manner, the upper cross member 51 and the lower cross member 52 may include a plurality of cross members as long as they perform the link function.

In the above preferred embodiments, the link mechanism 5 is preferably a parallel four joint link system. To compare the parallel four joint system with a so-called double wishbone link mechanism, with the parallel four joint link system, a group of components defining the link mechanism 5 is easily combined in the front cover 221, so that a space defined between the left front wheel 31 and the right front wheel 32 in the left-right direction of the body frame 21 is easily narrowed. Consequently, it is possible to significantly reduce or prevent the occurrence of the phenomenon that the leg portions of the rider sitting on the seat 24 are splashed with water scattered by the two front wheels 3 while making the vehicle 1 including the leanable body frame 21 and the two front wheels 3 that are arranged side by side in the left-right direction of the body frame 21 smaller in size. However, the link mechanism 5 may use a double wishbone configuration.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are included therein. When used in this description in relation to a direction and/or a member, the word "along" means that a case where the direction or the member is inclined at an angle falling within the range of ±40 degrees is included therein. When used in this description, the expression "something extends in a certain direction" means that a case where something extends while being inclined at an angle falling within the range of ±40 degrees relative to the certain direction is included therein.

The present invention can be embodied in many different forms. This description should be regarded as providing the preferred embodiments according to the principles of the present invention. The preferred embodiments which are at least described or illustrated in this description is so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this specification or the prosecution of this patent application. The preferred embodiments should be construed as being non-exclusive. For example, in this description, the terms "preferable" and "may" should be construed as being non-exclusive, and those terms mean, respectively, that it is "preferable but not limited thereto" and that it "may be acceptable but not limited thereto."

This application claims priority to Japanese Patent Application No. 2013-138486 filed on Jul. 1, 2013, the entire contents of which are hereby incorporated by reference. Namely, configurations which will be itemized below also constitute part of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame that leans to the left of the vehicle when the vehicle turns leftward and that leans to the right of the vehicle when the vehicle turns rightward;
a left front wheel and a right front wheel disposed side by side in a left-right direction of the body frame;
a seat supported by the body frame and disposed behind the left front wheel and the right front wheel in a front-rear direction of the body frame;
a steering device that turns the left front wheel and the right front wheel; and
an inner fender disposed behind the left front wheel and the right front wheel in the front-rear direction of the body frame, and ahead of the seat in the front-rear direction of the body frame; wherein
the steering device includes:
 a left shock absorber including a left supporting axle that supports the left front wheel; and
 a right shock absorber including a right supporting axle that supports the right front wheel;
the inner fender includes:
 a cover surface disposed behind a rear edge of the left front wheel and a rear edge of the right front wheel under a condition that the body frame is in an upright state and that the left front wheel and the right front wheel are not turned by the steering device;
 a left projecting portion projecting forward in the front-rear direction from the cover surface, extending in an up-down direction of the body frame, and disposed on the left of a center of the vehicle in the left-right direction of the body frame, on the right of a left end of the vehicle in the left-right direction of the body frame, and behind a rear edge of the left front wheel in the front-rear direction of the body frame under the condition that the body frame is in the upright state and that the left front wheel and the right front wheel are not turned by the steering device; and a right projecting portion projecting forward in the front-rear direction from the cover surface, extending in the up-down direction of the body frame, and disposed on the right of the center of the vehicle in the left-right direction of the body frame, on the left of a right end of the vehicle in the left-right direction of the body frame, and behind a rear edge of the right front wheel in the front-rear direction of the body frame under the condition that the body frame is in the upright state and that the left front wheel and the right front wheel are not turned by the steering device;

at least a portion of the cover surface located between the left projecting portion and the right projecting portion faces a space defined between the left front wheel and the right front wheel under the condition that the body frame is in the upright state and that the left front wheel and the right front wheel are not turned by the steering device;

when viewed in a cross-sectional plane that includes the front-rear direction of the body frame and the left-right direction of the body frame and intersects the body frame at a location above the left supporting axle and the right supporting axle and below top ends of the left front wheel and the right front wheel in the up-down direction of the body frame:

at least a portion of the left projecting portion is located behind the left front wheel in the front-rear direction of the body frame under the condition that the body frame is in the upright state and that the left front wheel and the right front wheel are not turned by the steering device; and at least a portion of the right projecting portion is located behind the right front wheel in the front-rear direction of the body frame under the condition that the body frame is in the upright state and that the left front wheel and the right front wheel are not turned by the steering device;

the left projecting portion includes a right side surface oriented rightward in the left-right direction of the body frame;

the right projecting portion includes a left side surface oriented leftward in the left-right direction of the body frame;

the right side surface of the left projecting portion and the cover surface extend in two planes extending in different directions in the cross-sectional plane and define a left bent portion that extends in the up-down direction and is not a continuously curved surface in the cross-sectional plane; and the left side surface of the right projecting portion and the cover surface extend in two planes extending in different directions in the cross-sectional plane and define a right bent portion that extends in the up-down direction and is not a continuously curved surface in the cross-sectional plane.

2. The vehicle as set forth in claim 1, wherein an angle defined by each of the left bent portion and the right bent portion is no less than about 45 degrees and no greater than about 135 degrees.

3. The vehicle as set forth in claim 1, wherein the cover surface includes:

a left cover surface disposed on the left of the center of the vehicle in the left-right direction of the body frame under the condition that the body frame is in the upright state and that the left front wheel and the right front wheel are not turned by the steering device; and a right cover surface disposed on the right of the center of the vehicle in the left-right direction of the body frame under the condition that the body frame is in the upright state and that the left front wheel and the right front wheel are not turned by the steering device;

a left portion of the left cover surface is disposed behind a right portion of the left cover surface in the front-rear direction of the body frame under the condition that the body frame is in the upright state and that the left front wheel and the right front wheel are not turned by the steering device;

a right portion of the right cover surface is disposed behind a left portion of the right cover surface in the front-rear direction of the body frame under the condition that the body frame is in the upright state and that the left front wheel and the right front wheel are not turned by the steering device;

the left projecting portion is adjacent to the left portion of the left cover surface; and the right projecting portion is adjacent to the right portion of the right cover surface.

4. The vehicle as set forth in claim 1, further comprising:

a link mechanism disposed above the left front wheel and the right front wheel in the up-down direction, and that leans the body frame to the left or to the right of the vehicle by changing positions of the left front wheel and the right front wheel relative to the body frame; wherein the link mechanism includes:

an upper cross member;

a lower cross member disposed below the upper cross member in the up-down direction of the body frame;

a left side member disposed above the left front wheel in the up-down direction of the body frame; and a right side member disposed above the right front wheel in the up-down direction of the body frame; and the upper cross member, the lower cross member, the left side member, and the right side member are connected so that the upper cross member and the lower cross member are held in postures which are parallel or substantially parallel to each other, and that the left side member and the right side member are held in postures which are parallel or substantially parallel to each other.

5. A vehicle comprising:

a body frame that leans to the left of the vehicle when the vehicle turns leftward and that leans to the right of the vehicle when the vehicle turns rightward;

a left front wheel and a right front wheel disposed side by side in a left-right direction of the body frame;

a seat supported by the body frame and disposed behind the left front wheel and the right front wheel in a front-rear direction of the body frame;

a steering device that turns the left front wheel and the right front wheel; and an inner fender disposed behind the left front wheel and the right front wheel in the front-rear direction of the body frame, and ahead of the seat in the front-rear direction of the body frame; wherein the inner fender includes:
a cover surface disposed behind a rear edge of the left front wheel and a rear edge of the right front wheel under a condition that the body frame is in an upright state and that the left front wheel and the right front wheel are not turned by the steering device;
a left projecting portion projecting forward in the front-rear direction from the cover surface, extending in an up-down direction of the body frame, and disposed on the left of a center of the vehicle in the left-right direction of the body frame, on the right of a left end of the vehicle in the left-right direction of the body frame, and behind a rear edge of the left front wheel in the front-rear direction of the body frame under the condition that the body frame is in the upright state and that the left front wheel and the right front wheel are not turned by the steering device; and
a right projecting portion projecting forward in the front-rear direction from the cover surface, extending in the up-down direction of the body frame, and disposed on the right of the center of the vehicle in the left-right direction of the body frame, on the left of a right end of the vehicle in the left-right direction of the body frame, and behind a rear edge of the right front wheel in the front-rear direction of the body frame under the condition that the body frame is in the upright state and that the left front wheel and the right front wheel are not turned by the steering device;
at least a portion of the cover surface located between the left projecting portion and the right projecting portion faces a space defined between the left front wheel and the right front wheel under the condition that the body frame is in the upright state and that the left front wheel and the right front wheel are not turned by the steering device;
a projecting amount of the left projecting portion from the cover surface increases as the left projecting portion extends upward in the up-down direction of the body frame; and
a projecting amount of the right projecting portion from the cover surface increases as the right projecting portion extends upward in the up-down direction of the body frame.

6. A vehicle comprising:
a body frame that leans to the left of the vehicle when the vehicle turns leftward and that leans to the right of the vehicle when the vehicle turns rightward;
a left front wheel and a right front wheel disposed side by side in a left-right direction of the body frame;
a seat supported by the body frame and disposed behind the left front wheel and the right front wheel in a front-rear direction of the body frame;
a steering device that turns the left front wheel and the right front wheel;
an inner fender disposed behind the left front wheel and the right front wheel in the front-rear direction of the body frame, and ahead of the seat in the front-rear direction of the body frame; and
a wall portion; wherein the inner fender includes:
a cover surface disposed behind a rear edge of the left front wheel and a rear edge of the right front wheel under a condition that the body frame is in an upright state and that the left front wheel and the right front wheel are not turned by the steering device;
a left projecting portion projecting forward in the front-rear direction from the cover surface, extending in an up-down direction of the body frame, and disposed on the left of a center of the vehicle in the left-right direction of the body frame, on the right of a left end of the vehicle in the left-right direction of the body frame, and behind a rear edge of the left front wheel in the front-rear direction of the body frame under the condition that the body frame is in the upright state and that the left front wheel and the right front wheel are not turned by the steering device; and
a right projecting portion projecting forward in the front-rear direction from the cover surface, extending in the up-down direction of the body frame, and disposed on the right of the center of the vehicle in the left-right direction of the body frame, on the left of a right end of the vehicle in the left-right direction of the body frame, and behind a rear edge of the right front wheel in the front-rear direction of the body frame under the condition that the body frame is in the upright state and that the left front wheel and the right front wheel are not turned by the steering device;
at least a portion of the cover surface located between the left projecting portion and the right projecting portion faces a space defined between the left front wheel and the right front wheel under the condition that the body frame is in the upright state and that the left front wheel and the right front wheel are not turned by the steering device; and
the wall portion extends in the left-right direction of the body frame, and projects forward in the front-rear direction from the cover surface between the left projecting portion and the right projecting portion.

7. The vehicle as set forth in claim 6, wherein a projecting amount of the left projecting portion from the cover surface and a projecting amount of the right projecting portion from the cover surface is greater than a projecting amount of the wall portion.

8. The vehicle as set forth in claim 6, wherein the wall portion includes:
a left wall portion disposed on the left of the center of the vehicle in the left-right direction under the condition that the body frame is in the upright state and that the left front wheel and the right front wheel are not turned by the steering device;
a right wall portion disposed on the right of the center of the vehicle in the left-right direction under the condition that the body frame is in the upright state and that the left front wheel and the right front wheel are not turned by the steering device;
the left projecting portion includes a right side surface oriented rightward in the left-right direction of the body frame;
the right projecting portion includes a left side surface oriented leftward in the left-right direction of the body frame;
a left end portion of the left wall portion is in contact with the right side surface; and
a right end portion of the right wall portion is in contact with the left side surface.

9. The vehicle as set forth in claim 6, wherein the wall portion is inclined downward in the up-down direction of the body frame.

10. The vehicle as set forth in claim 6, further comprising an opening penetrating the cover surface directly below the wall portion.

* * * * *